(12) United States Patent
Jonsson et al.

(10) Patent No.: US 11,181,008 B1
(45) Date of Patent: Nov. 23, 2021

(54) SELF-PRESSURIZED SQUEEZE FILM DAMPER

(71) Applicant: Raytheon Technologies Corporation, Farmington, CT (US)

(72) Inventors: Ulf J. Jonsson, South Windsor, CT (US); Daniel L. Gysling, South Glastonbury, CT (US); Philip Andrew Varney, Coventry, CT (US); Andrzej Ernest Kuczek, Bristol, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/931,706

(22) Filed: Jul. 17, 2020

(51) Int. Cl.
| | |
|---|---|
| *F16C 27/04* | (2006.01) |
| *F16C 19/06* | (2006.01) |
| *F01D 25/16* | (2006.01) |
| *F16F 15/023* | (2006.01) |
| *F16C 35/04* | (2006.01) |

(52) U.S. Cl.
CPC .............. *F01D 25/16* (2013.01); *F16C 19/06* (2013.01); *F16C 27/045* (2013.01); *F16F 15/0237* (2013.01); *F05D 2220/32* (2013.01); *F05D 2240/54* (2013.01); *F16C 2360/23* (2013.01); *F16F 2222/12* (2013.01)

(58) Field of Classification Search
CPC .... F01D 25/16; F01D 25/164; F05D 2220/32; F05D 2240/54; F05D 2260/96; F16C 27/045; F16C 35/042; F16C 2360/23; F16F 15/0237; F16F 2222/12
USPC .......................................................... 384/99
See application file for complete search history.

(56) References Cited

U.S. PATENT DOCUMENTS

| | | | | |
|---|---|---|---|---|
| 3,844,630 A | * | 10/1974 | Lechner .................. | F16C 39/04 384/99 |
| 5,058,452 A | | 10/1991 | El-Shafei | |
| 5,169,240 A | * | 12/1992 | Bobo ..................... | F01D 25/164 29/898.1 |
| 5,178,400 A | * | 1/1993 | Singh ..................... | F16C 27/045 277/644 |
| 5,344,239 A | * | 9/1994 | Stallone ................ | F01D 25/164 384/99 |
| 6,135,639 A | * | 10/2000 | Dede ..................... | F16C 27/045 384/581 |

(Continued)

FOREIGN PATENT DOCUMENTS

| | | | | |
|---|---|---|---|---|
| FR | 2965858 A1 | * | 4/2012 | .......... F16F 15/0237 |
| FR | 3067057 B1 | | 12/2018 | |

*Primary Examiner* — Phillip A Johnson
(74) *Attorney, Agent, or Firm* — Kinney & Lange, P.A.

(57) ABSTRACT

A fluid damping structure includes first and second annular elements, first and second inner seals, a first outer seal, a damping chamber, a supply plenum, a fill port, and a plurality of fluid passages. The first and second inner seals are disposed radially between and are engaged with the first annular element and the second annular element. The first outer seal forms a sealing interface between the first and second annular elements. The first outer seal is disposed radially outward from the first and second inner seals. The damping chamber is defined by the first and second annular elements and the first and second inner seals. The supply plenum is disposed contiguous with an axial side of the damping chamber and extends from the second inner seal to the first outer seal. The fill port is in fluid communication with the supply plenum and a source of damping fluid.

10 Claims, 13 Drawing Sheets

(56) References Cited

U.S. PATENT DOCUMENTS

| | | |
|---|---|---|
| 8,167,494 B2 | 5/2012 | Gibbons |
| 9,841,056 B2 * | 12/2017 | Snow ...................... F01D 25/18 |
| 10,233,778 B2 * | 3/2019 | Gysling ............... F16C 27/045 |
| 10,502,081 B2 | 12/2019 | Bioud et al. |
| 2017/0335767 A1 * | 11/2017 | Gysling .................. F02K 3/025 |
| 2018/0274588 A1 * | 9/2018 | Hudson ................ F01D 25/166 |
| 2019/0071997 A1 | 3/2019 | Jonsson et al. |
| 2019/0071998 A1 | 3/2019 | Gysling et al. |
| 2020/0080445 A1 | 3/2020 | Gysling et al. |

\* cited by examiner

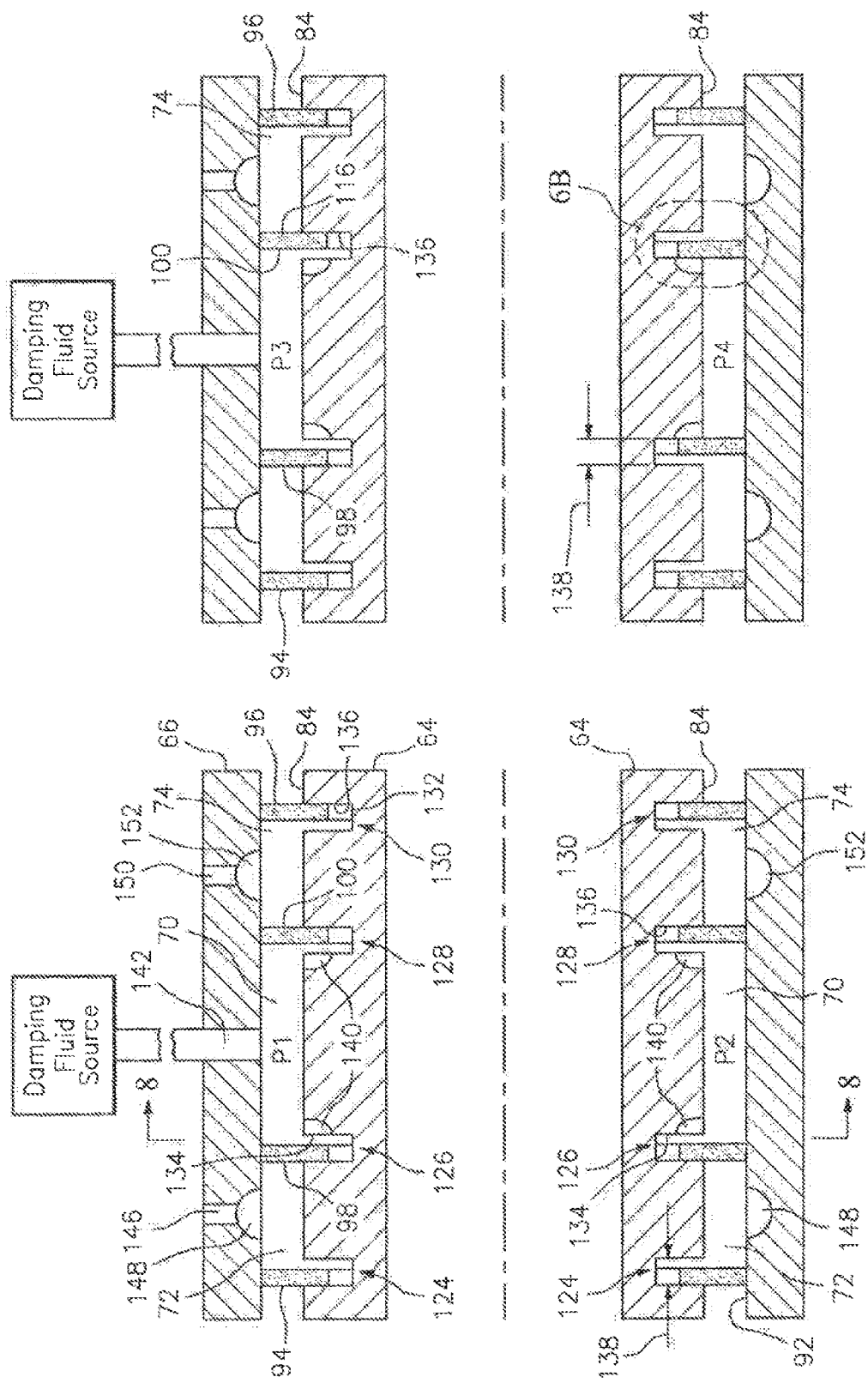

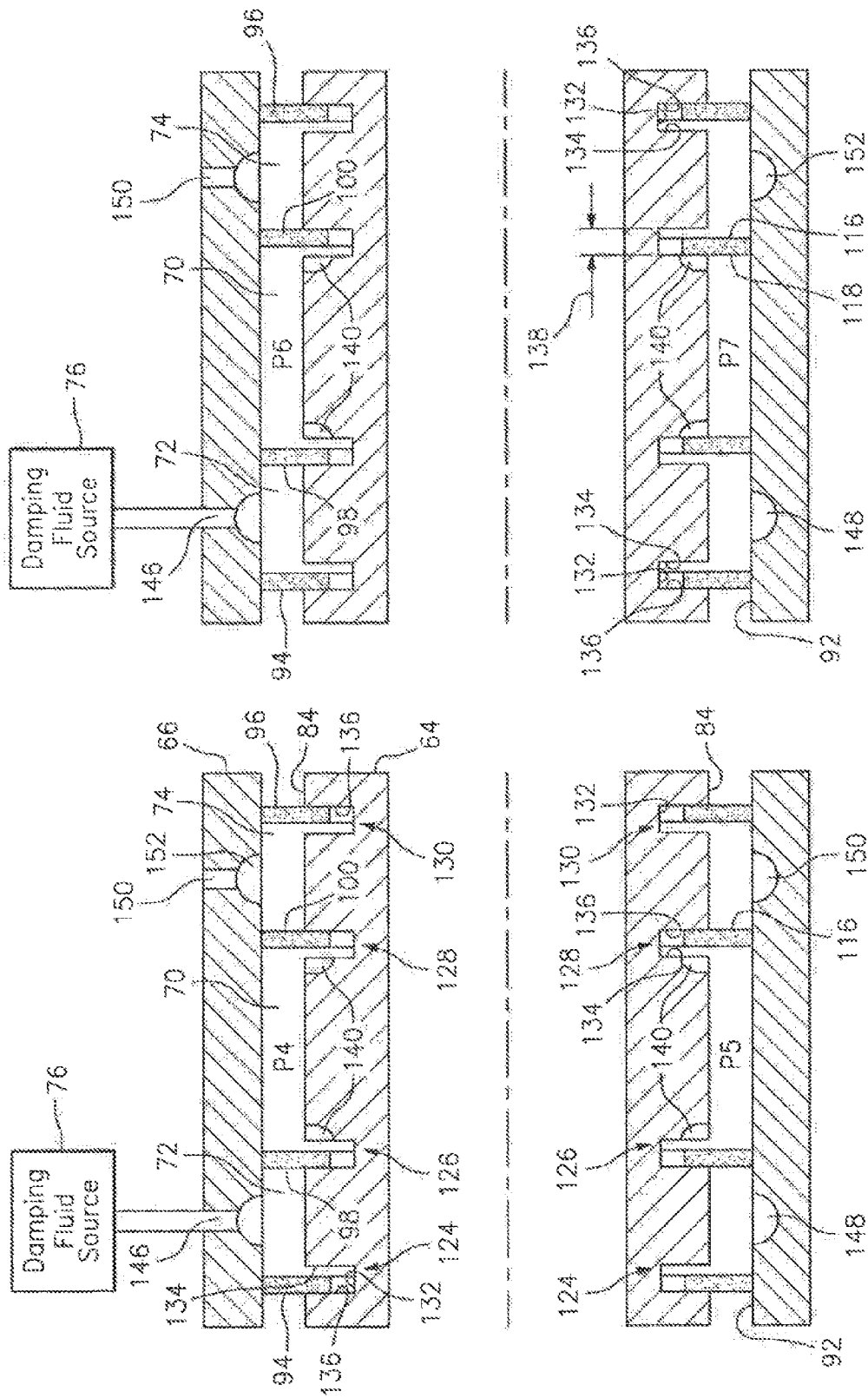

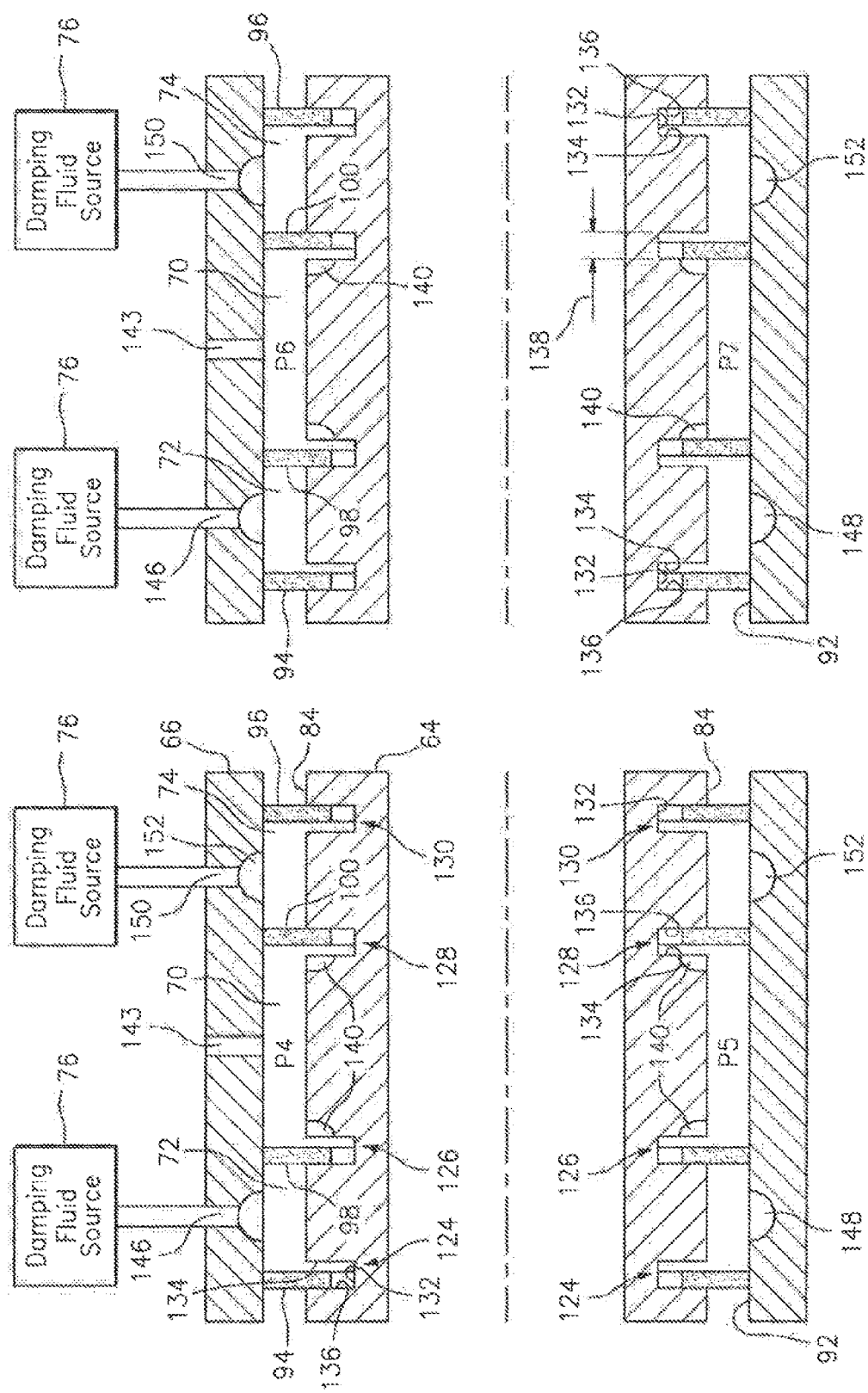

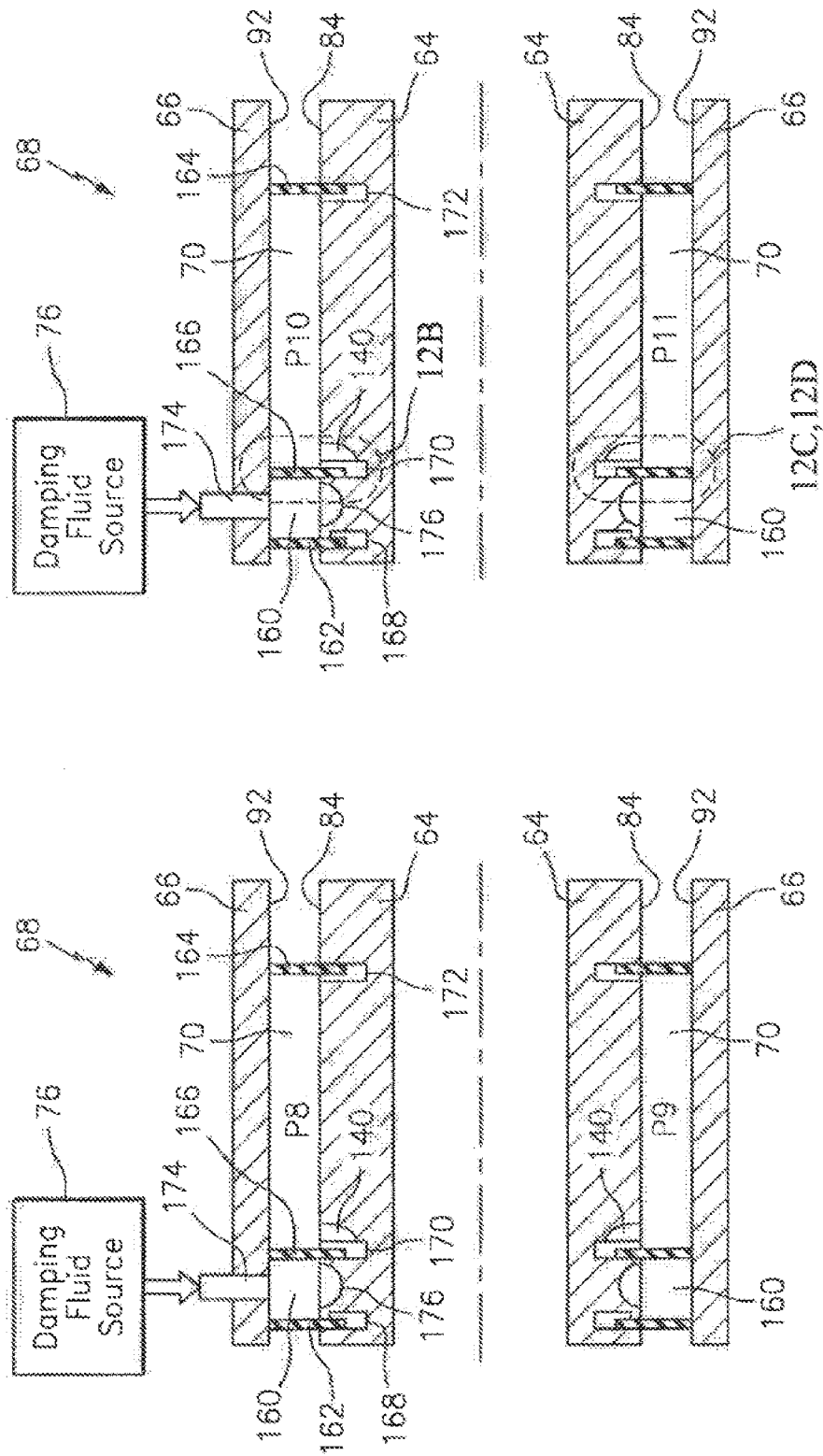

SELF-PRESSURIZED SQUEEZE FILM DAMPER

BACKGROUND

This disclosure relates generally to rotating shaft damping structures and more particularly to rotating shaft fluid damping structures.

Gas turbine engines are often configured to include a fan section, a low pressure compressor section, a high pressure compressor section, a combustor section, a low pressure turbine section, a high pressure turbine section, a low speed spool, and a high speed spool. The fan section may be configured to drive air along a bypass flow path, while the compressor section drives air along a core flow path for compression and communication into the combustor section then expansion through the turbine section. The low speed spool and the high speed spool are mounted for rotation about an engine central longitudinal axis relative to an engine static structure via several bearing systems. The low speed spool generally interconnects the fan section, the low pressure compressor section and the low pressure turbine section. The high speed spool generally interconnects the high pressure compressor section and the high pressure turbine section. The combustor section is disposed between the high pressure compressor section and the high pressure turbine section.

Under normal operating conditions, a shaft section of a spool (e.g., a shaft section of the high speed spool) will rotate without significant vibration. Under certain operating conditions, however, a spool shaft section may be subject to cyclical, orbital motion which can lead to undesirable vibration. Such cyclical, orbital motion may be the product of temporary thermal bowing of the spool shaft section as a result of a thermal gradient within the engine. Once the thermal gradient sufficiently dissipates, the temporary bowing dissipates and the spool shaft section restores itself to normal operating condition.

As will be appreciated by those skilled in the art, the existence of an imbalance in a shaft section may result in a greatly increased demand on the bearing components to restrain the movement of the rotating member or shaft and to transfer the lateral forces induced by the imbalance into the machinery mounting structure. As will be described herein, this type of imbalance can exist with a gas turbine engine shaft. It should be noted, however, that this type of rotating shaft imbalance can exist in other types of machinery other than in a gas turbine engine.

One method of reducing the aforesaid lateral forces and attendant stresses on the bearings is the use of a fluid damping structure (sometimes referred to as "fluid squeeze damper") between the outer portion of the shaft bearing race or housing and the supporting engine case. The fluid damper structure is a hydrodynamic system wherein a continuously flowing stream of damping fluid (e.g., oil) is supplied to an annular volume formed between the non-rotating outer bearing race (or housing) and the engine support case for the purpose of absorbing and reducing the transverse movement induced by shaft imbalance, temporary or otherwise. The damping fluid, which can be supplied from a lubricating system (e.g., a gas turbine engine lubricating system), first fills and subsequently exits the annular volume, and then is collected and passed to a recovery system (e.g., including a scavenge sump or the like).

SUMMARY

A fluid damping structure includes first and second annular elements, first and second inner seals, a first outer seal, a damping chamber, a supply plenum, a fill port, and a plurality of fluid passages. The first annular element with an outer radial surface and the second annular element having an inner radial surface. The first inner seal is disposed radially between and is engaged with both the first annular element and the second annular element. The second inner seal is disposed radially between and is engaged with both the first annular element and the second annular element. The first outer seal forms a sealing interface between the first annular element and the second annular element. The first outer seal is disposed radially outward from at least one of the first and second inner seals. The damping chamber is defined by the first annular element, the second annular element, the first inner seal, and the second inner seal. The supply plenum is disposed contiguous with an axial side of the damping chamber and extends from the second inner seal to the first outer seal. The fill port is in fluid communication with the supply plenum and a source of damping fluid. The plurality of fluid passages is disposed in the first annular element. The fluid damping structure is configured such that one or more of the fluid passages is disposed in an open configuration when a local damping fluid pressure within the damping chamber is less than a local damping fluid pressure in an adjacent region of the supply plenum, and the one or more of the fluid passages is disposed in a closed configuration when the local damping fluid pressure within the damping chamber is greater than the local damping fluid pressure in the adjacent region of the supply plenum.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 6 is a diagrammatic illustration of a fluid damping structure embodiment shown in a closed configuration.

FIG. 6A is a diagrammatic illustration of the fluid damping structure embodiment shown in FIG. 6, in an open configuration.

FIG. 7 is a diagrammatic illustration of a fluid damping structure embodiment shown in a closed configuration.

FIG. 7A is a diagrammatic illustration of the fluid damping structure embodiment shown in FIG. 7, in an open configuration.

FIG. 11 is a diagrammatic illustration of a fluid damping structure embodiment shown in a closed configuration.

FIG. 11A is a diagrammatic illustration of the fluid damping structure embodiment shown in FIG. 11, in an open configuration.

FIG. 12 is a diagrammatic illustration of a fluid damping structure embodiment shown in a closed configuration.

FIG. 12A is a diagrammatic illustration of the fluid damping structure embodiment shown in FIG. 12, in an open configuration.

Figure 1:
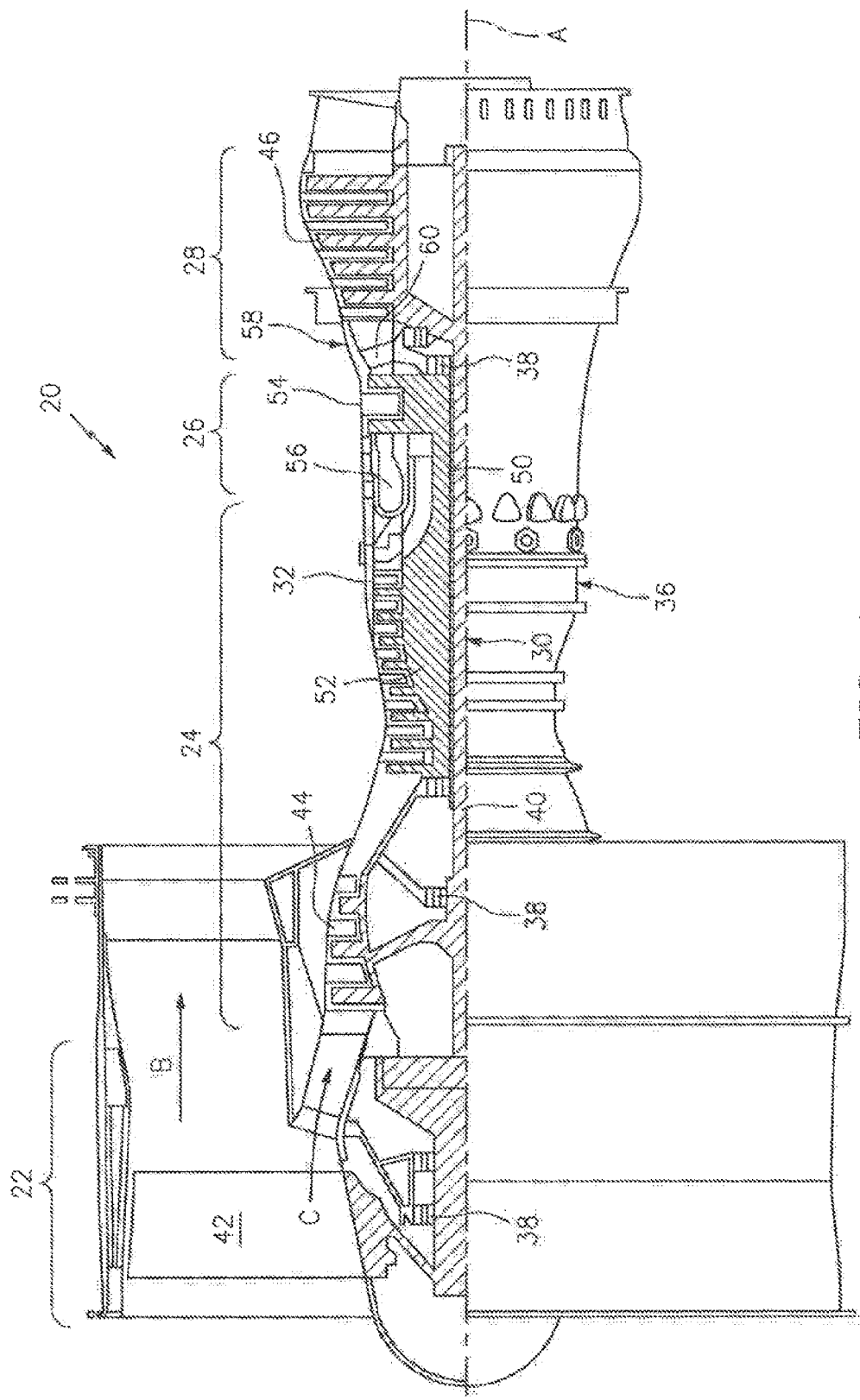
FIG. 1 is a diagrammatic partially sectioned view of a gas turbine engine.

While the above-identified figures set forth one or more embodiments of the present disclosure, other embodiments are also contemplated, as noted in the discussion. In all cases, this disclosure presents by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

For a discussion of exemplary rotating shaft fluid damping structures, see U.S. patent application Ser. No. 15/696,552 entitled "SELF PRESSURIZING SQUEEZE FILM DAMPER" filed on Sep. 6, 2017 and U.S. patent application Ser. No. 15/946,862 entitled "SELF PRESSURIZING SQUEEZE FILM DAMPER" filed on Sep. 6, 2017, which are herein incorporated by reference in their entireties.

Referring to the figures, to facilitate the description of the present disclosure a two-spool turbofan type gas turbine engine 20 is shown (e.g., see FIG. 1). This exemplary embodiment of a gas turbine engine includes a fan section 22, a compressor section 24, a combustor section 26, a turbine section 28, and an engine lubrication system in fluid communication with one or more fluid damping structures. The fan section 22 drives air along a bypass flow path "B" in a bypass duct, while the compressor section 24 drives air along a core flow path "C" for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of machinery with rotating shafts; e.g., a gas turbine engine with a three-spool architecture, a high speed turbocharger that may be used in an automotive application, or a ground based gas turbine engine application that may be used in a power generation application or a land based vehicle, etc.

The exemplary engine 20 shown in FIG. 1 includes a low speed spool 30 and a high speed spool 32 mounted for rotation about an engine central longitudinal axis "A" relative to an engine static structure 36 via several bearing systems 38. It should be understood that the location, number, and characteristics of bearing systems 38 may vary to suit the particular applications.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 diagrammatically depicted in FIG. 1 is one example of a high-bypass geared aircraft engine. In other examples, the gas turbine engine 20 may have a bypass ratio that is greater than about six (6), with an example embodiment being greater than about ten (10), the geared architecture 48 may be an epicyclic gear train, such as a planetary gear system or other gear system, with a gear reduction ratio of greater than about 2.3 and the low pressure turbine 46 may have a pressure ratio that is greater than about five (5:1). In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five (5:1). The low pressure turbine 46 pressure ratio is pressure measured prior to the inlet of the low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one or more embodiments of a geared architecture engine and that the present disclosure is applicable to other gas turbine engines including direct drive turbofans.

Figure 2:
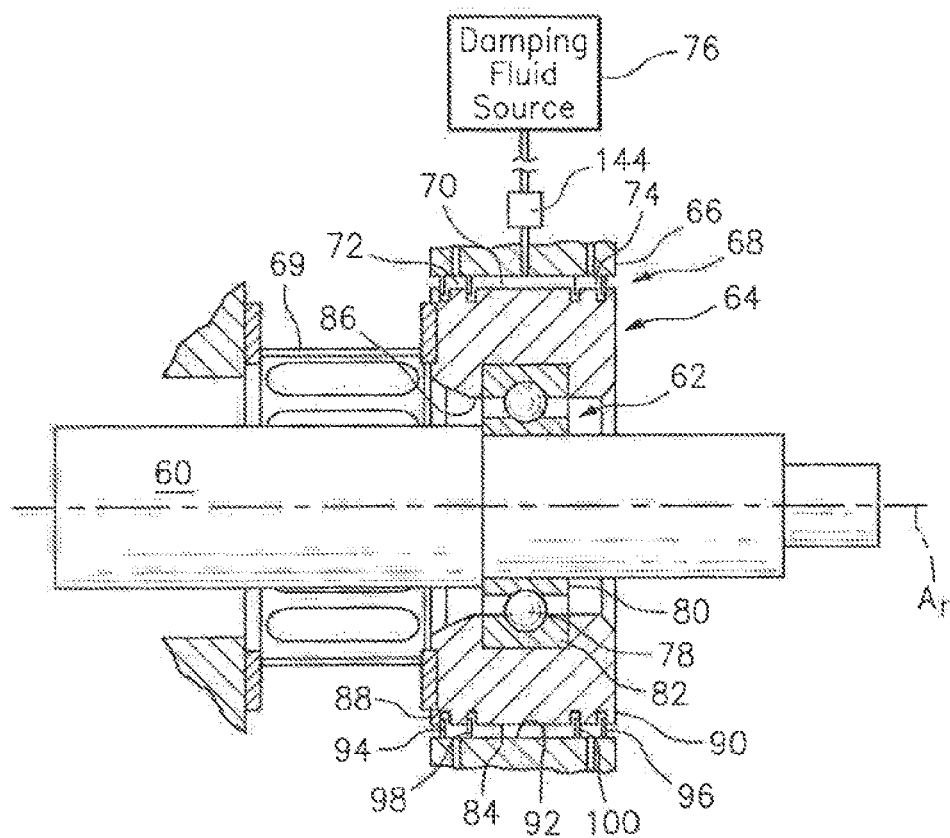
FIG. 2 is a diagrammatic cross-sectional view of a portion of a gas turbine engine showing a bearing compartment with a bearing and a fluid damping structure.

FIG. 2 is a simplified cross-sectional view of a portion of a gas turbine engine. The engine portion includes a rotor shaft 60 (e.g., a shaft section of a high speed spool), a bearing 62, a bearing housing 64, a stator structure 66, and a fluid damping structure 68. In the non-limiting embodiment shown in FIG. 2, the bearing housing 64 is mounted to a cage structure 69 disposed adjacent thereto. As will be described below, the bearing housing 64 may be subjected to forces that cause a cyclical, orbital motion (sometimes referred to as a "whirl") of the bearing housing 64. The cage structure 69 permits some amount of elastic motion of the bearing housing 64 (e.g., the "whirling") in response to the aforesaid forces. The fluid damping structure 68 embodiment shown in FIG. 2 includes a damping chamber 70, a first lateral chamber 72, and a second lateral chamber 74. A source 76 of damping fluid (e.g., oil) is provided to the fluid damping structure 68 by, for example, the engine lubricating system. The rotor shaft 60 is rotatable about an axis of rotation Ar. The bearing 62 includes roller elements 78 (e.g., spherical balls) disposed between an inner race 80 and an outer race 82. The present disclosure is not limited to any particular bearing configuration. The bearing inner race 80 is mounted on the rotor shaft 60 and therefore rotates with the rotor shaft 60. The bearing outer race 82 is not fixed with the rotor shaft 60 and does not rotate about the axis of rotation Ar. The bearing housing 64 is nonrotating (i.e., it does not rotate about the axis of rotation Ar) and has an outer radial surface 84, an inner radial surface 86, a first lateral surface 88, and a second lateral surface 90. It should be noted that the geometric configuration of the bearing housing 64 shown in FIG. 2 and described herein is an example of a structure for supporting the bearing 62 and forming a portion of the fluid damping structure 68. The present disclosure is not limited to this particular embodiment. As will be described below, the bearing housing 64 may be subjected to forces that cause a cyclical, orbital motion (sometimes referred to as a "whirl") of the bearing housing 64, but such whirling motion is not considered to be rotation about the rotor shaft axis of rotation Ar. The inner and outer radial surfaces 84, 86 extend generally between the first and second lateral surfaces 88, 90. The bearing outer race 82 is engaged with the inner radial surface 86 of the bearing housing 64. The stator structure 66 includes a cylindrical inner radial surface 92 that is spaced radially apart from the outer radial surface 84 of the bearing housing 64.

In the embodiments shown in FIGS. 2, 6, 6A-6C, 7, 7A, 9, 11 and 11A, at least two pairs of seals extend between the bearing housing outer radial surface 84 and the inner radial surface 92 of the stator structure 66. In the embodiment shown in FIGS. 2, 6, 6A, 7 and 7A, the fluid damping structure 68 includes a pair of outer seals (e.g., first outer seal 94, second outer seal 96) and a pair of inner seals (e.g., first inner seal 98, second inner seal 100). The aforesaid inner and outer seals may be any type of seal that is capable of providing the sealing function in the fluid damping structure 68. For example, the outer seals 94, 96 may be ring type seals and the inner seals 98, 100 may be ring type seals. To facilitate the description herein, the inner and outer seals 64, 96, 98, 100 are described herein as ring type seals, but are not limited to this type of seal. The inner seals 98, 100 are disposed axially between the outer seals 94, 96; e.g., the first inner seal 98 is disposed axially between the first outer seal 94 and the second inner seal 100, and the second inner seal 100 is disposed axially between the first inner seal 98 and the second outer seal 96. The inner and outer seals 94, 96, 98, 100 are spaced axially apart and extend circumferentially about the axis of rotation Ar of the rotor shaft 60.

Figure 3:
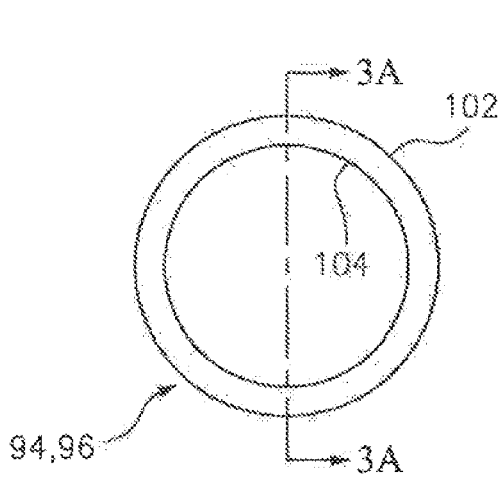
FIG. 3 is a diagrammatic planar view of an outer ring seal embodiment.
Figure 3A:
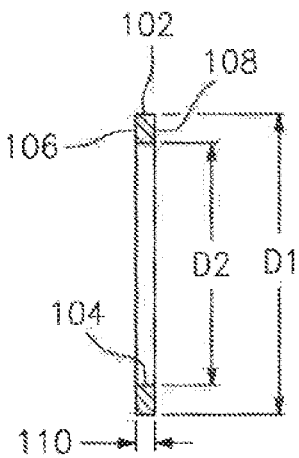
FIG. 3A is a cross-sectional view of the outer ring seal shown in FIG. 3.

Now referring to FIGS. 3 and 3A, in some embodiments each outer seal 94, 96 has an outer diameter surface 102 disposed at a diameter "D1", an inner diameter surface 104 disposed at a diameter "D2" (D1>D2), a first lateral surface 106, a second lateral surface 108, and a thickness 110. The first and second lateral surfaces 106, 108 extend between the outer diameter surface 102 and the inner diameter surface 104. The thickness 110 of each outer seal 94, 96 extends between the lateral surfaces 106, 108.

Figure 4:
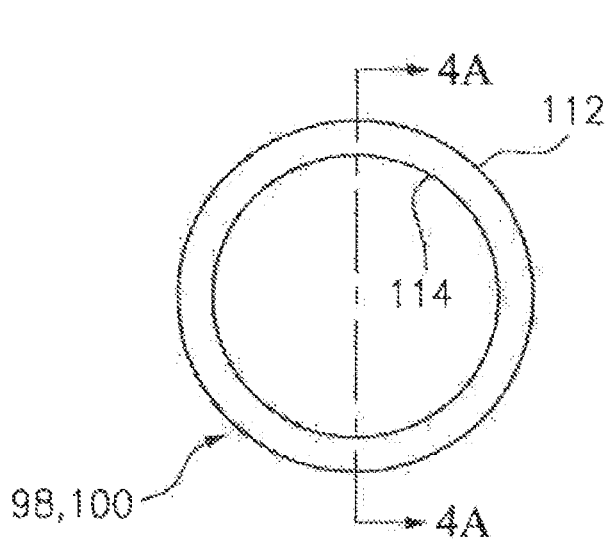
FIG. 4 is a diagrammatic planar view of an inner ring seal embodiment.
Figure 4A:
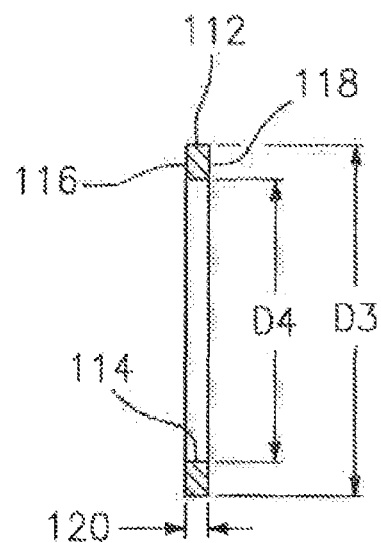
FIG. 4A is a cross-sectional view of the inner ring seal shown in FIG. 4.

Now referring to FIGS. 4 and 4A, in some embodiments each inner seal 98, 100 has an outer diameter surface 112 disposed at a diameter "D3", an inner diameter surface 114 disposed at a diameter "D4" (D3>D4), a first lateral surface 116, a second lateral surface 118, and a thickness 120. The first and second lateral surfaces 116, 118 of each inner seal 98, 100 extend between the outer diameter surface 112 and the inner diameter surface 114. The thickness 120 of each inner seal 98, 100 extends between the lateral surfaces 116, 118.

Figure 5:
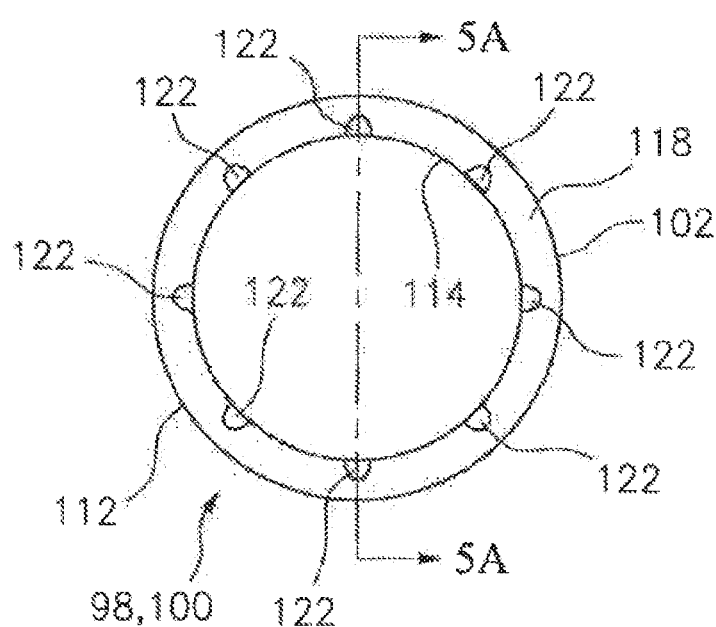
FIG. 5 is a diagrammatic planar view of an inner ring seal embodiment.

In the inner seal 98, 100 embodiments shown in FIGS. 3 and 4, the lateral surfaces 116, 118 of the inner seals 98, 100 may be planar and substantially parallel one another. In some alternative embodiments, each inner seal 98, 100 may include a plurality of passages that extend between the inner diameter surface 114 and the second lateral surface 118. For example, FIG. 5 diagrammatically illustrates an inner seal 98, 100 embodiment having passages 122 in the form of troughs 122, extending between the inner diameter surface 114 and the second lateral surface 118. These troughs 122 are configured to allow passage of damping fluid through an annular groove, under certain circumstances as will be described below. The troughs 122 are not limited to any particular geometric configuration. The troughs 122 may all have the same geometric configuration, or there may be one or more troughs 122 having a first geometric configuration, one or more troughs 122 having a second geometric configuration, etc. The trough 122 embodiment shown in FIG. 5 breaks through the edge formed at the intersection of the inner diameter surface 114 and the second lateral surface 118 of the inner seal 98, 100. In alternative embodiments, the troughs 122 may extend between the inner diameter surface 114 and the outer diameter surface 112, thereby creating a passage between the two surfaces 112, 114. The troughs 122 are spaced apart from one another, distributed around the circumference of the respective inner seal 98, 100. In the embodiments shown in FIGS. 5 and 5A the troughs 122 are uniformly distributed around the circumference of the inner annular groove 126, 128; i.e., each trough 122 is spaced apart from an adjacent trough 122 by an equal angular separation. FIG. 5 shows the eight troughs 122 disposed around the circumference of the respective inner seal 98, 100, each disposed forty-five degrees from the adjacent troughs 122. The present disclosure is not, however, limited to circumferential uniformly distributed troughs 122.

Now referring to the embodiment shown in FIG. 2, the damping chamber 70 portion of the fluid damping structure 68 is defined at least in part by the outer radial surface 84 of the bearing housing 64, the inner radial surface 92 of the stator structure 66, and inner seals 98, 100. The first lateral chamber 72 portion of the fluid damping structure 68 is defined at least in part by the outer radial surface 84 of the bearing housing 64, the inner radial surface 92 of the stator structure 66, the first outer seal 94, and the first inner seal 98. The second lateral chamber 74 portion of the fluid damping structure 68 is defined at least in part by the outer radial surface 84 of the bearing housing 64, the inner radial surface 92 of the stator structure 66, the second outer seal 96, and the second inner seal 100.

The outer radial surface 84 of the bearing housing 64 may include an annular groove for each of the inner and outer seals 94, 96, 98, 100. The present disclosure is not limited to embodiments having an annular groove for each of the inner and outer seals 94, 96, 98, 100; e.g., the bearing housing 64 may be configured to constrain, and provide one or more sealing surfaces for the outer seals, with a structure other than an annular groove. In the embodiments shown in FIGS. 6 and 7, the outer radial surface 84 of the bearing housing 64 includes a first outer annular groove 124, a first inner annular groove 126, a second inner annular groove 128, and a second outer annular groove 130. The aforesaid grooves 124, 126, 128, 130 (also shown in FIG. 2) are axially spaced apart from one another, and the inner annular grooves 126, 128 are disposed axially between the outer annular grooves 124, 130; e.g., the first inner annular groove 126 is disposed axially between the first outer annular groove 124 and the second inner annular groove 128, and the second inner annular groove 128 is disposed axially between the first inner annular groove 126 and the second outer annular groove 130. The aforesaid annular grooves extend into the outer radial surface 84 of the bearing housing 64 and each has a base surface 132, an inner side surface 134, and an outer side surface 136 opposite the inner side surface 134. The annular groove base surface 132 is located at a depth from the outer radial surface 84. Each annular groove 124, 126, 128, 130 has a width 138 that extends between the opposing side surfaces 134, 136. As will be described below, the width 138 of a given annular groove is greater than the width 110, 120 of the seal disposed within the respective groove so that the seal may translate axially within the groove. In FIGS. 6 and 7, all of the grooves 124, 126, 128, 130 are shown as having the same geometric configuration and dimensions; e.g., rectangular having the same depth and width. The present disclosure is not, however, limited to all grooves 124, 126, 128, 130 having the same geometric configuration and/or dimensions.

In some embodiments (e.g., see FIGS. 6 and 7), the bearing housing 64 has a plurality of passages 140 engaged with each inner annular groove 126, 128, each passage 140 extending between inner side surface 134 of the respective groove and the outer radial surface 84 of the bearing housing 64. The passages 140 are configured to provide a conduit for damping fluid through the inner annular groove 126, 128, under certain circumstances as will be explained below. The passages 140 are spaced apart from one another, distributed around the circumference of the respective inner annular groove 126, 128. The passages 140 may, for example, be uniformly spaced around the circumference of the respective inner annular groove 126, 128. The present disclosure is not, however, limited to uniformly distributed passages 140. Each passage 140 is configured to extend into the respective inner annular groove 126,128 at a radial position at least in part exposed below the inner diameter surface 114 of the respective inner ring seal 98, 100 as will be explained below.

Figure 8:
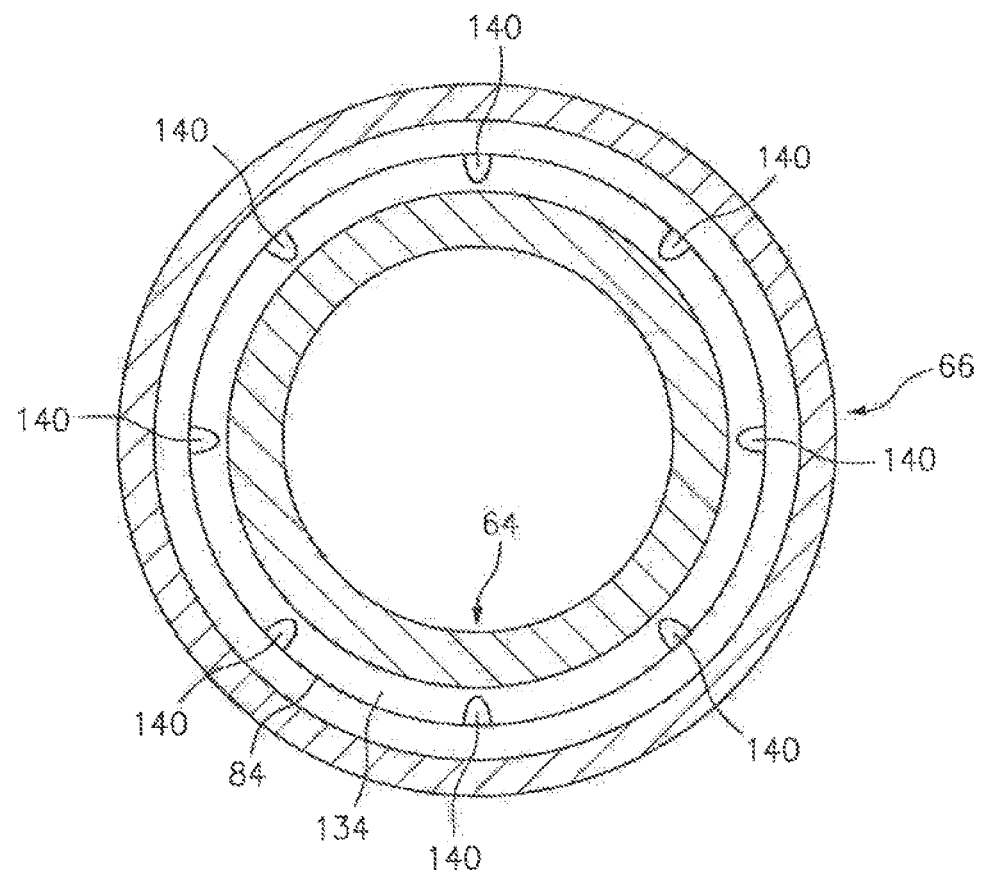
FIG. 8 is a sectional view of the diagrammatic fluid damping structure shown in FIG. 6.
Figure 9:
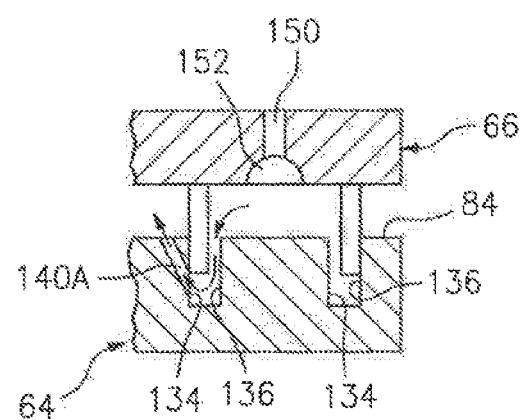
FIG. 9 is a diagrammatic partial sectional view of a fluid damping structure illustrating a passage embodiment.

FIGS. 6 and 7 illustrate a non-limiting example of a passage 140 in the form of a trough that extends into the inner side surface 134 of the respective inner annular groove 126, 128, and extends into the outer radial surface 84 of the bearing housing 64, thereby providing a fluid passage between inner side surface 134 of the inner annular groove 126, 128 and the outer radial surface 84 of the bearing housing 64. The troughs 140 are spaced apart from one another, distributed around the circumference of the respective inner annular groove 126,128. In the embodiments shown in FIGS. 6 and 7, the troughs 140 are uniformly distributed around the circumference of the inner annular groove 126, 128; i.e., each trough 140 is spaced apart from an adjacent trough 140 by an equal angular separation. FIG. 8 shows the eight troughs 140 disposed around the circumference of the respective inner annular groove 126, 128, each disposed forty-five degrees from the adjacent troughs 140. The present disclosure is not, however, limited to circumferential uniformly distributed troughs 140.

As indicated, the troughs 140 are configured to provide a passage for damping fluid out of, or into, the inner annular groove 126,128, under certain circumstances. The troughs 140 are not limited to any particular geometric configuration. The troughs 140 may all have the same geometric configuration, or there may be one or more troughs 140 having a first geometric configuration, one or more troughs 140 having a second configuration, etc. The trough 140 embodiment shown in FIGS. 6-8 breaks through the edge formed at the intersection of the inner side surface 134 of the respective inner annular groove 126, 128 and the outer radial surface 84 of the bearing housing 64. The geometric characteristics of the troughs 140 may be chosen to suit the application; e.g., sized to permit adequate fluid flow under the anticipated operating condition of the device. To be clear, the troughs 140 shown in FIGS. 6-8 are non-limiting examples of a passage extending between the inner side surface 134 of an inner annular groove 126, 128 and the outer radial surface 84 of the bearing housing 64, and the present disclosure is not limited to this particular embodiment. As another example (e.g., see FIG. 9), the passages may be apertures 140A that extend between the inner side surface 134 of an inner annular groove 126, 128 and the outer radial surface 84 of the bearing housing 64. Such apertures 140A would not break through the edge formed at the intersection of the inner side surface 134 of the inner annular groove 126, 128 and the outer radial surface 84 of the bearing housing 64.

As indicated above, the pairs of seals 94, 96, 98, 100 extend between the bearing housing outer radial surface 84 and the inner radial surface 92 of the stator structure 66. The outer diameter surface of each seal is typically biased against the inner radial surface 92 of the stator structure 66 and provides some amount fluid sealing there between. In the embodiment shown in FIGS. 6, 7, and 9, each of the inner and outer seals are received a distance into the respective annular groove; e.g., each inner seal 98, 100 extends a distance into one of the inner annular grooves 126, 128, and each outer seal 94, 96 extends a distance into one of the outer annular grooves 124, 130.

In the embodiments shown in FIGS. 2, 6, 7 and 11, the fluid damping structure 68 is configured to provide damping fluid to the damping chamber 70, the first lateral chamber 72, and the second lateral chamber 74. In the embodiment shown in FIG. 6, for example, the fluid damping structure 68 includes a fill port 142 disposed in the stator structure 66 that permits damping fluid to enter the damping chamber 70 through the inner radial surface 92 of the stator structure 66. The fill port 142 is in fluid communication with the damping fluid source 76 (e.g., the engine lubrication system) and may include a one way check valve 144 (see FIG. 2) that allows fluid to enter the damping chamber 70 but prevents fluid passage in the opposite direction. The embodiment shown in FIG. 6 may further include a first lateral chamber port 146 and an annular plenum 148 disposed in the inner radial surface 92 of the stator structure 66 aligned with the first lateral chamber 72, and a second lateral chamber port 150 and an annular plenum 152 disposed in the inner radial surface 92 of the stator structure 66 aligned with the second lateral chamber 74. The annular plenums 148, 152 are shown diagrammatically as having an arcuately shaped cross-section but are not limited thereto. For example, in FIGS. 6, 6A, 7, and 7A the annular plenums are shown disposed in an embodiment of the inner radial surface 92 that extends in a single plane across the first lateral chamber 72, the damping chamber 70, and the second lateral chamber. In alternative embodiments, the inner radial surface 92 may have a non-planar configuration wherein the geometry of one or both of the lateral chambers 72, 74 differ from that of the damping chamber 70, and thereby functions as an annular plenum. In still further alternative embodiments, the outer radial surface 84 of the bearing housing 64 may include an annular plenum or be configured to function as an annular plenum.

In an alternative embodiment shown in FIG. 7, the fluid damping structure 68 includes a first lateral chamber port 146 and an annular plenum 148 disposed in the inner radial surface 92 of the stator structure 66 aligned with the first lateral chamber 72, and a second lateral chamber port 150 and an annular plenum 152 disposed in the inner radial surface 92 of the stator structure 66 aligned with the second lateral chamber 74. One of the first or second lateral chamber ports 146, 150 is in fluid communication with the damping fluid source 76 (e.g., the engine lubrication system) and may include a one way check valve (e.g., like that shown in FIG. 6) that allows fluid to enter the respective lateral chamber 72, 74 but prevents fluid passage in the opposite direction. FIG. 7 shows the first lateral chamber port 146 in fluid communication with the damping fluid source 76.

In an alternative embodiment shown in FIGS. 11 and 11A, the fluid damping structure 68 includes a first lateral chamber port 146 and an annular plenum 148 disposed in the inner radial surface 92 of the stator structure 66 aligned with the first lateral chamber 72, and a second lateral chamber port 150 and an annular plenum 152 disposed in the inner radial surface 92 of the stator structure 66 aligned with the second lateral chamber 74. Both of the first and second lateral chamber ports 146, 150 are in fluid communication with the damping fluid source 76 (e.g., the engine lubrication system) and may include a one way check valve (e.g., like that shown in FIG. 6) that allows fluid to enter the respective lateral chamber 72, 74 but prevents fluid passage in the opposite direction. An exit port 143 extends through the stator structure 66 at a position aligned with the damping chamber.

In a gas turbine engine that is operating under "normal" conditions (e.g., in a constant RPM cruise mode), the fluid pressure within the damping chamber 70 is substantially consistent around the circumference of the damping chamber 70. In an imbalanced condition (e.g., operating conditions such as a thermal gradient within an engine that exists at start up) however, a rotating spool shaft 60 may be subject to cyclical, orbital motion (i.e., "whirl"). This type of imbalanced condition and motion can create variations in fluid pressure within the damping chamber 70 (i.e., a dynamic pressure component that varies as a function of time and circumferential position). The variations in pressure may be considered as a pressure field representative of forces acting on the rotor shaft 60 during whirl by the film of damping fluid disposed between the outer radial surface 84 of the bearing housing 64 and the inner radial surface 92 of the stator structure 66, around the circumference of the damping chamber 70. The stator structure 66 is fixed, and the bearing housing 64 whirls with the rotor shaft 60. The pressure field develops as the rotor shaft 60 whirls, resolving the net force acting on the rotor into components that align with the eccentricity and components that are perpendicular to the eccentricity. When a sufficient amount of rotor shaft 60 whirl occurs, the pressure field will include a region of positive pressure with respect to the circumferential mean of the pressure within the damping chamber 70 (i.e., a region of pressure greater than the circumferential mean pressure), and a region of negative pressure with respect to the circumferential mean of the pressure within the damping chamber 70 (i.e., a region of pressure less than the circumferential mean pressure). The circumferential differences in pressure within the damping chamber 70 cause the damping fluid to travel circumferentially within the damping chamber 70.

Figure 10:
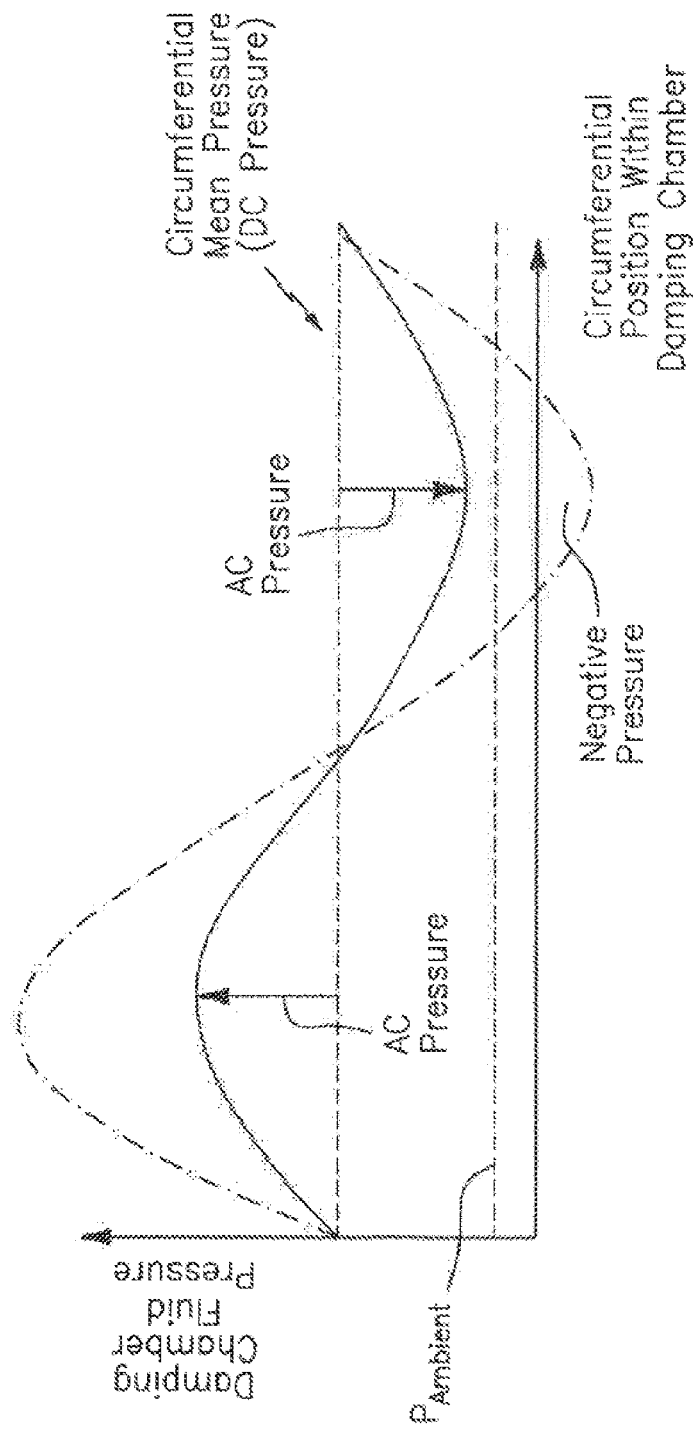
FIG. 10 is a graph depicting damper chamber fluid pressure versus circumferential position within the damping chamber.

To visualize the aforesaid pressure field, it is useful to "unwrap" the fluid pressure within the damping chamber 70 as a function of circumferential position as shown in FIG. 10. In this idealized representation, the circumferential mean pressure (sometimes referred to as the "DC" pressure) within the damping chamber is typically set by the characteristics of the damper fluid supply system and the leakage of the oil through the damping chamber seals. As the damping chamber seals approach ideal seals (i.e., no leakage), the DC pressure approaches the damping fluid supply pressure. The unsteady part of the pressure within the damping chamber (sometimes referred to as the "AC" pressure) amplitude, builds with whirl amplitude. The larger the whirl, the larger the AC pressure amplitude becomes. This idealized model works well conceptually until the zero-to-peak amplitude of the AC pressure causes the local pressure to fall below compartment pressure (denoted as Pambient in FIG. 10). In some prior art squeeze film dampers, if the pressure within a damping chamber falls below Pambient, air within an engine compartment adjacent to the damping chamber may be drawn into the damping chamber from the adjacent engine compartment. Once air, or any gas, is entrained within the prior art damping chamber, the effectiveness of the squeeze film damper may be compromised. In some instances, if the damping chamber of a prior art squeeze film damper is isolated from any ingress of air from the adjacent engine compartment into the damping chamber, the damping fluid within the damping chamber may cavitate if the local pressure within the damping chamber is reduced below the vapor pressure of the damping fluid and thereby compromise the effectiveness of the squeeze film damper.

To decrease or avoid the possibility of an influx of gas (e.g., compartment air) into the damping chamber 70 of the present fluid damping structure 68 and/or damping fluid cavitation within the damping chamber 70, the present fluid damping structure 68 is configured to "self-pressurize" the damping chamber 70.

Using the exemplary embodiment shown in FIG. 6 as an example, as a gas turbine engine 20 is operated in a start-up mode (e.g., rotor shaft low rpms), damping fluid is fed into the damping chamber 70 via the fill port 142 extending through the stator structure 66. Some amount of the damping fluid bypasses the inner seals 98, 100, enters and fills the first and second lateral chambers 72, 74. In a short period of time, some amount of the damping fluid within the first and second lateral chambers 72, 74 will exit the lateral chambers bypassing the outer seals 94, 96 and/or via the first and second lateral chamber ports 146, 150. The damping fluid exiting the lateral chambers 72, 74 may exit into the adjacent engine compartment where it is collected and returned to the main lubrication system via a scavenging system. Hence, the damping fluid cycles through the fluid damping structure 68 during operation. The first and second lateral chamber ports 146, 150 are configured to provide an appropriate amount of flow impedance so that the lateral chambers 72, 74 remain filled with pressurized damping fluid during operation. In those embodiments that include an annular plenum 148, 152 in communication with the respective lateral chamber port 146, 150, the annular plenum 148, 152 assists in maintaining in circumferential fluid pressure uniformity within the lateral chamber 72, 74. Under normal conditions (e.g., no whirl), the fluid pressure within the damping chamber 70 is substantially uniform around the circumference of the damping chamber 70. The substantially uniform fluid pressure is diagrammatically illustrated by the pressure values P1 and P2 in different regions substantially equally one another; i.e., P1≈P2, and the fluid damping structure 68 will continue to operate in this mode indefinitely and the circumferential pressure field within the damping chamber 70 will remain substantially uniform. In this mode, elevated relative fluid pressure within the damping chamber 70 will force the first lateral surface 116 of the each inner seal 98, 100 into contact with the outer side surface 136 of the respective inner annular groove 126, 128 and will provide fluid sealing there between albeit with some amount of leakage. In this configuration, the passages 140 (e.g., disposed within the bearing housing 64 or the passages 122 disposed in the lateral surface 118 of the inner seal 98, 100) may be described as being in a closed configuration since any fluid flow through the passages 140, 122 remains within the damping chamber 70 and does not contribute to any damping fluid flow (e.g., leakage about the seal that may occur) between the damping chamber and one or both of the lateral chambers 72, 74.

Figures 6B, 6C:
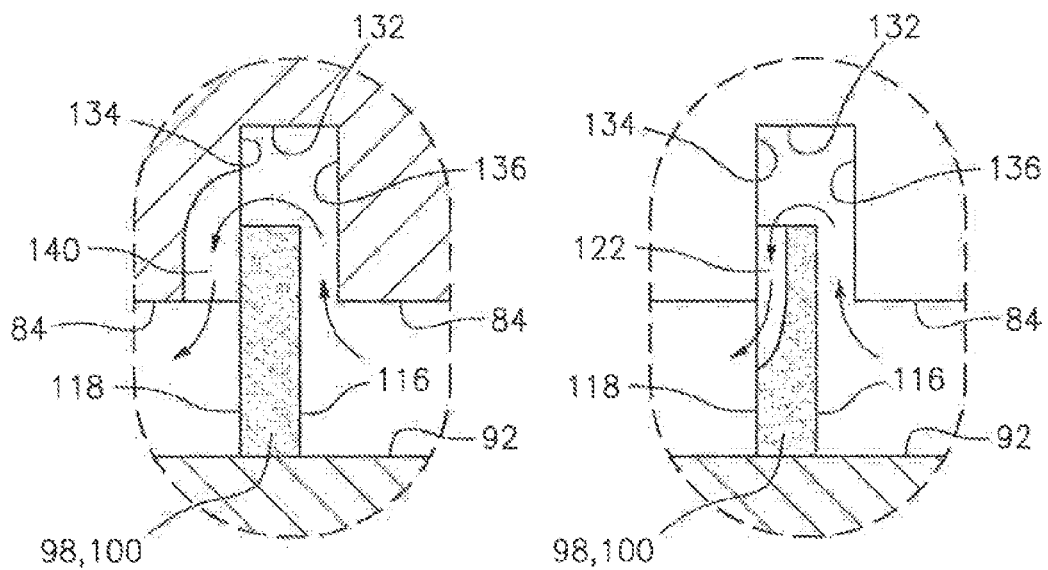
FIG. 6B is an enlarged partial view of FIG. 6A.
FIG. 6C is an enlarged partial view of FIG. 6A, illustrating a different embodiment.

Under circumstances wherein the rotor shaft 60 is experiencing a sufficient amount of whirl, an unsteady circumferential pressure field as described above will develop. In the high pressure region (e.g., P3—See FIG. 6A) of the circumferential pressure field, the fluid pressure within the damping chamber 70 will continue to force a first lateral surface 116 of the each inner seal 98, 100 into contact with the outer side surface 136 of the respective inner annular groove 126, 128 and provide fluid sealing there between. In the low pressure region (e.g., P4) of the circumferential pressure field, in contrast, the fluid pressure within the adjacent lateral chambers 72, 74 will exceed the fluid pressure within the adjacent damping chamber 70 region. As a result and in that region, the inner seal 98, 100 will deflect away from the outer side surface 136 of the respective inner annular groove 126, 128 toward the inner side surface 134 of the aforesaid inner annular groove 126, 128. If the difference in pressure is great enough, the inner seal 98, 100 second lateral surface 118 will be held in contact with the inner side surface 134 of the respective inner annular groove 126, 128 (e.g., as shown in the bottom of FIG. 6A). As a result, the passages 140 (e.g., disposed within the bearing housing 64 or the passages 122 disposed in the lateral surface 118 of the inner ring seal 98, 100) aligned with the damping chamber 70 low pressure region permit a flow of damping fluid from the respective lateral chamber 72, 74, through the inner annular groove 126, 128, and into the aforesaid region of the damping chamber 70 motivated by the difference in fluid pressure between the adjacent lateral chamber region and the damping chamber region. FIGS. 6B and 6C show enlarged views of this configuration. The aforesaid fluid flow locally into the damping chamber 70 causes a local increase in damping fluid pressure within the damping chamber 70 that helps prevent or eliminates the possibility of cavitation of damping fluid within the low fluid pressure region, and improves the performance of the fluid damping structure 68. The damping fluid structure configuration having lateral chambers 72, 74 adjacent the damping chamber 70 helps prevent or eliminates the ingress of compartment air into the damping chamber 70. The eccentric whirling of the rotor shaft 60 and bearing housing 64 makes the above described creation of high pressure regions and low pressure regions a dynamic event that can be accommodated at any circumferential position by the present fluid damping structure 68; e.g., the circumferentially distributed passages 122, 140. In this configuration, the passages 140 (e.g., disposed within the bearing housing 64 or the passages 122 disposed in the lateral surface 118 of the inner ring seal 98, 100) may be described as being in an open configuration since fluid flow through the passages 140, 122 contributes to damping fluid flow (e.g., in addition to any leakage about the ring seal that may occur) between the damping chamber and one or both of the lateral chambers 72, 74. It should be noted that the pressure zones (e.g., P1 and P2, P3 and P4) are diagrammatically shown at opposite positions (e.g., 180° from one another) for illustrative purposes. High and low pressures zones may occur at various circumferential positions within the damping chamber, and therefore the diagrams should not be construed as limiting the performance of the present disclosure.

The fluid damping structure 68 embodiment shown in FIG. 7 operates in a manner similar to that described above in terms of the fluid damping structure 68 embodiment shown in FIGS. 6 and 6A. The fluid damping structure 68 embodiment shown in FIG. 7, however, illustrates an alternative damping fluid travel path through the fluid damping structure 68. As described above, in the alternative embodiment one of the first or second lateral chamber ports 146, 150 is in fluid communication with the damping fluid source 76 (e.g., the engine lubrication system). In the diagrammatic illustration of FIGS. 7 and 7A, the first lateral chamber port 146 is shown in communication with the damping fluid source 76. In this configuration as a gas turbine engine 20 is operated in a start-up mode (e.g., rotor shaft low rpms), damping fluid is fed into the first lateral chamber 72 via the first lateral chamber fill port 146. Some amount of the damping fluid bypasses the first inner seal 98, enters and fills the damping chamber 70, and subsequently bypasses the second inner seal 100, enters and fills the second lateral chamber 74. Similar to the description above, some amount of the damping fluid will exit the lateral chambers 72, 74 bypassing the outer seals 94, 96. In this configuration, some amount of damping fluid may also exit the second lateral chamber 74 via the second lateral chamber port 150. The damping fluid exiting the lateral chambers 72, 74 may exit into the adjacent engine compartment where it is collected and returned to the main lubrication system via a scavenging system. The second lateral chamber port 150 may be configured to provide an appropriate amount of flow impedance so that the second lateral chamber 74 remains filled with pressurized damping fluid during operation.

Under normal conditions (e.g., no whirl), the fluid pressure within the damping chamber 70 is substantially uniform around the circumference of the damping chamber 70. The substantially uniform fluid pressure is diagrammatically illustrated in FIG. 7 (see also FIG. 11) by the pressure values P4 and P5 in different regions substantially equally one another (i.e., P4≈P5), and the fluid damping structure 68 will continue to operate in this mode indefinitely and the circumferential pressure field within the damping chamber 70 will remain substantially uniform. As described above, in this configuration the passages 140, 122 are in a closed configuration.

Under circumstances wherein the rotor shaft 60 is experiencing a sufficient amount of whirl, an unsteady circumferential pressure field as described above will develop. In the high pressure region of the circumferential pressure field (e.g., P6 as shown in FIG. 7A, FIG. 11A), the fluid pressure within the damping chamber 70 will continue to force the first lateral surface 116 of the each inner seal 98, 100 into contact with the outer side surface 136 of the respective inner annular groove 126, 128 and provide fluid sealing there between. In the low pressure region of the circumferential pressure field (e.g., P7 as shown in FIG. 7A, FIG. 11A), in contrast, the fluid pressure within the adjacent lateral chambers 72, 74 will exceed the fluid pressure within the adjacent damping chamber region. As a result, and in that region, the inner seal 98, 100 will deflect away from the outer side surface 136 of the respective inner annular groove 126, 128 toward the inner side surface 134 of the aforesaid inner annular groove 126, 128. If the difference in pressure is great enough, the inner seal 98, 100 will be held in contact with the inner side surface 134 of the respective inner annular groove 126, 128 (e.g., as shown in the bottom of FIG. 7A, FIG. 11A). As a result, the passages 140 (e.g., disposed within the bearing housing 64 or the passages 122 disposed in the lateral surface of the inner seal 98, 100) aligned with the damping chamber 70 low pressure region permit a flow of damping fluid from the respective lateral chamber 72, 74, through the inner annular groove 126, 128, and into the aforesaid region of the damping chamber 70 motivated by the difference in fluid pressure between the adjacent lateral chamber region and the damping chamber 70 region. As described above, in this configuration the passages 140,122 are in an open configuration.

The fluid damping structure 68 embodiment shown in FIGS. 11 and 11A operates in a manner similar to that described above in terms of the fluid damping structure 68 embodiment shown in FIGS. 6, 6A, 7, and 7A. The fluid damping structure 68 embodiment shown in FIGS. 11 and 11A, however, illustrates an alternative damping fluid travel path through the fluid damping structure 68. As described above, in this alternative embodiment both of the first and second lateral chamber ports 146, 150 are in fluid communication with the damping fluid source 76 (e.g., the engine lubrication system). In this configuration as a gas turbine engine 20 is operated in a start-up mode (e.g., rotor shaft low rpms), damping fluid is fed into the first lateral chamber 72 via the first lateral chamber fill port 146, and into the second lateral chamber 74 via the second lateral chamber fill port 150. Some amount of the damping fluid bypasses the first and second inner seals 98, 100, enters and fills the damping chamber 70. Similar to the description above, some amount of the damping fluid will exit the lateral chambers 72, 74 bypassing the outer seals 94, 96. In this configuration, some amount of damping fluid may also exit the damping chamber 70 via the exit port 143. The damping fluid exiting the lateral chambers 72, 74 may exit into the adjacent engine compartment where it is collected and returned to the main lubrication system via a scavenging system. The damping fluid exiting the damping chamber 70 via the exit port 143 may be passed directly to a scavenging system or may pass into the adjacent engine compartment. The exit port 143 may be configured to provide an appropriate amount of flow impedance so that the damping chamber 70 remains filled with pressurized damping fluid during operation.

Figure 12B:
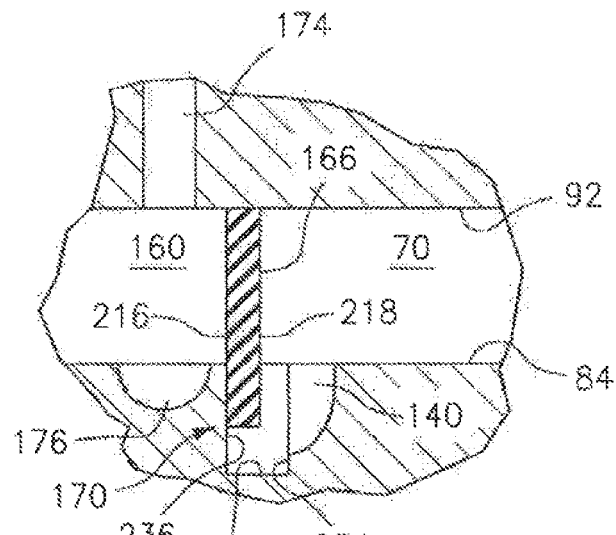
FIG. 12B is an enlarged partial view of FIG. 12A.
Figure 12C:
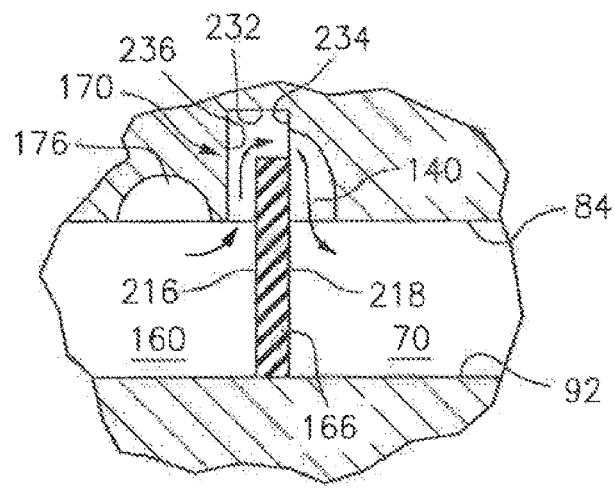
FIG. 12C is an enlarged partial view of FIG. 12A.
Figure 12D:
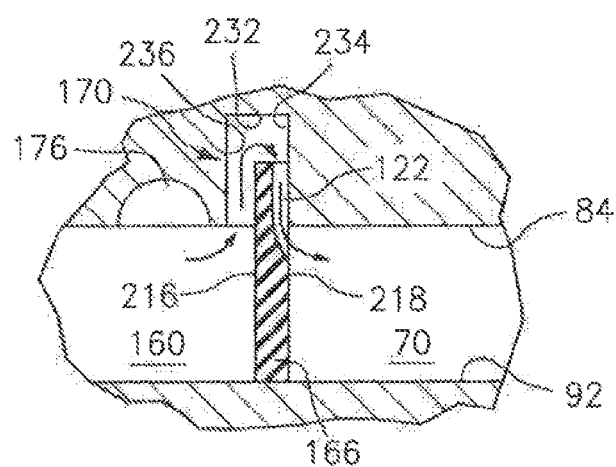
FIG. 12D is an enlarged partial modified view of FIG. 12A, illustrating an embodiment of the passages.

FIGS. 12 and 12A show another embodiment of the above described fluid damping structures 68. In this embodiment, the fluid damping structure 68 includes a damping chamber 70 and a supply plenum 160. The supply plenum 160 may be disposed on either side of the damping chamber 70. The supply plenum 160 is configured (e.g., sufficient radial clearance and sufficient effective hydraulic diameter, etc.) to ensure that the local pressure within the supply plenum 160 remains above compartment pressure (i.e., the local pressure outside the fluid damping structure) under high whirl conditions. The fluid damping structure 68 is configured to have low fluid flow resistance for damping fluid entering the damping chamber 70 from the supply plenum 160 and high flow resistance for reverse flow from the damping chamber 70 back into the supply plenum 160; i.e., a diodicitic configuration. In this embodiment, the fluid damping structure 68 includes a first outer seal 162, a second outer seal 164, and an inner seal 166. The first outer seal 162, second outer seal 164, and inner seal 166 are spaced axially apart from one another and extend circumferentially about the axis of rotation Ar of the rotor shaft 60. The inner seal 166 is disposed axially between the first outer seal 162 and the second outer seal 164. The damping chamber 70 is defined at least in part by the outer radial surface 84 of the bearing housing 64, the inner radial surface 92 of the stator structure 66, the inner seal 166 and the second outer seal 164. The supply plenum 160 is defined at least in part by the outer radial surface 84 of the bearing housing 64, the inner radial surface 92 of the stator structure 66, the first outer seal 162, and the inner seal 166. As indicated above, the seals 162, 164, 166 may be any type of seal that is capable of providing the sealing function in the fluid damping structure 68; e.g., ring type seals. As described above, the outer radial surface 84 of the bearing housing 64 may include a circumferentially extending annular groove for each of the first outer seal 162, the inner seal 166, and the second outer seal 164; e.g., a first outer annular groove 168, an inner annular groove 170, and a second outer annular groove 172. The inner annular groove 170 may be described as having a base surface 232, an inner side surface 234, and an outer side surface 236 opposite the inner side surface 234 (See FIGS. 12B and 12C). The aforesaid annular grooves 168, 170, 172 are axially spaced apart from one another, and the inner annular groove 170 is disposed axially between the first outer annular groove 168 and the second outer annular groove 172. Each of the aforesaid annular grooves may be configured in the manner described above. The fluid damping structure 68 includes at least one fill port 174 in fluid communication with the supply plenum 160 and with a source 76 of damping fluid (e.g., oil from an engine lubricating system). The supply plenum 160 may include at least one annular plenum 176. In the exemplary embodiment shown in FIGS. 12 and 12A, an annular plenum 176 is shown disposed in the outer radial surface 84 of the bearing housing 64. Alternatively, the annular 176 plenum may be disposed in the inner radial surface 92 of the stator structure 66, or annular plenums 176 may be disposed in both the inner radial surface 92 and the outer radial surface 84. As will be described below, the annular plenum(s) 176 may assist in maintaining in circumferential fluid pressure uniformity within the supply plenum 160.

Figure 5A:
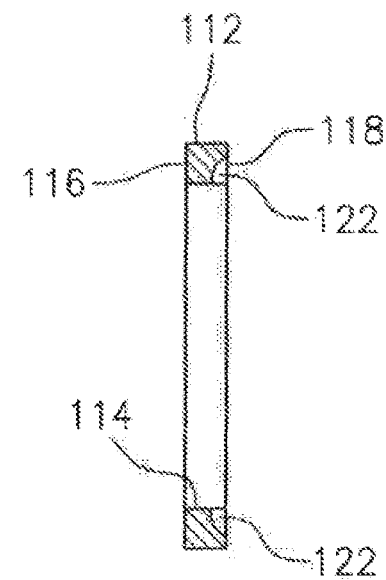
FIG. 5A is a cross-sectional view of the inner ring seal shown in FIG. 5.

In regards to selective fluid passage between the supply plenum 160 and the damping chamber, the fluid damping structure 68 of this embodiment may include a plurality of passages (e.g., troughs 140, or apertures 140A) in communication with the inner annular groove 170 that receives the inner seal 166 may, or may include a plurality of passages (e.g., troughs 122) in the inner seal 166, as described above (e.g., see FIGS. 5 and 5A).

In regard to the fluid damping structure embodiment shown in FIGS. 12 and 12A, when a gas turbine engine 20 is operated in a start-up mode (e.g., rotor shaft low rpms), damping fluid is fed from the fill port 174 into the supply plenum 160. Damping fluid will bypass the inner seal 166, enter, and fill the damping chamber 70 until the circumferentially averaged fluid pressure within the damping chamber 70 and the supply plenum 160 are substantially equal.

Under normal conditions (e.g., no whirl; see FIG. 12), the fluid pressure within the damping chamber 70 and the supply plenum 160 are substantially equal to one another and are also substantially uniform around their respective circumference. The substantially uniform fluid pressure is diagrammatically illustrated by the pressure values P8 and P9 in different circumferential regions substantially equally one another, i.e., P8≈P9, and the fluid damping structure 68 will continue to operate in this mode indefinitely. In this mode, where the circumferentially averaged fluid pressure within the damping chamber 70 and the supply plenum 160 are substantially equal, the inner seal 166 is not relied upon for sealing between the damping chamber 70 and the supply plenum 160. The first outer seal 162 and the second outer seal 164, on the other hand, both function to seal and maintain fluid pressure within the respective supply plenum 160 and damping chamber 70, albeit subject to some amount of leakage. Whatever damping fluid leakage occurs across the first and second outer seals 162, 164 is replenished by damping fluid from the source 76.

Referring to FIGS. 12A-12D, under circumstances wherein the rotor shaft 60 is experiencing a sufficient amount of whirl, an unsteady circumferential pressure field as described above will develop. In a high pressure region (e.g., see P10 in FIG. 12A, and see FIG. 12B) of the circumferential pressure field within the damping chamber 70, the fluid pressure within the damping chamber 70 will force a first lateral surface 216 of the inner seal 166 into contact with the outer side surface 236 of the inner annular groove 170, creating a fluid and pressure seal there between; i.e., a portion of the inner seal is forced into contact with the outer side surface 236 of the inner annular groove 170. In a low pressure region (e.g., P11; See FIGS. 12A, 12C, 12D) of the circumferential pressure field within the damping chamber 70, in contrast, the local fluid pressure within the supply plenum 160 will exceed the local fluid pressure within the adjacent damping chamber 70 region. As a result, and in that region, the inner seal 166 will be forced toward the inner side surface 234 of the inner annular groove 170. If the difference in pressure is great enough, the second lateral surface 218 of the inner seal 170 will be held in contact with the inner side surface 234 of the inner annular groove 170 (e.g., as shown in the bottom of FIG. 12A and in FIGS. 12C and 12D); i.e., a portion of the inner seal is forced into contact with the inner side surface 234 of the inner annular groove 170. As a result, the passages (e.g., passages 140 disposed within the bearing housing 64 (FIG. 12C), or passages 122 disposed in the lateral surface 218 of the inner seal 166—FIG. 12D) aligned with the damping chamber low pressure region permit a flow of damping fluid from the supply plenum 160, through the inner annular groove 170, and into the aforesaid region of the damping chamber 70 motivated by the difference in fluid pressure between the adjacent supply plenum region and the damping chamber region. The aforesaid fluid flow locally into the damping chamber 70 causes a local increase in damping fluid pressure within the damping chamber 70 that helps prevent or eliminate the possibility of damping fluid cavitation within the low fluid pressure region, and improves the performance of the fluid damping structure 68. The position of the supply plenum 160 contiguous with the damping chamber 70 helps prevent or eliminates the ingress of compartment air into the damping chamber 70. The eccentric whirling of the rotor shaft 60 and bearing housing 64 makes the above described creation of high pressure regions and low pressure regions a dynamic event that can be accommodated at any circumferential position by the present fluid damping structure 68; e.g., the circumferentially distributed passages 122, 140, 140A. In this configuration, the passages 140 (140A, 122) may be described as being in an open configuration since fluid flow through the passages 140, 140A, 122 contributes to damping fluid flow between the damping chamber 70 and the supply plenum 160.

Some amount of damping fluid will exit the fluid damping structure 68 via leakage across the first outer seal 162 (exiting the supply plenum 160) and the second outer seal 164 (exiting the damping chamber 70). Damping fluid that exits the fluid damping structure 68 will pass into the adjacent engine compartment where it is collected and returned to the main lubrication system via a scavenging system. The first outer seal 162 and the second outer seal 164 are configured to provide an appropriate amount of fluid flow impedance so that leakage from the fluid damping structure 68 is held at an acceptable level.

The fluid damping structure 68 embodiment described above is configured to provide a low fluid flow resistance for damping fluid entering the damping chamber 70 from the supply plenum 160 (e.g., at circumferential regions where the local fluid pressure within the supply plenum 160 is equal to or greater than the local fluid pressure within the damping chamber 70, damping fluid may pass through passages 140, 140A, 122; hence relatively low resistance), and configured to provide relatively high fluid flow resistance for damping fluid flow from the damping chamber 70 back into the supply plenum 160 (e.g., at circumferential regions where the local fluid pressure within the damping chamber 70 is greater than the local fluid pressure within the supply plenum 160, fluid passage through passages 140, 140A, 122 is not possible; hence, any fluid passage in these regions may occur, if at all, only based on seal leakage and therefore at a relatively high resistance). This diodicitic nature of the inner seal 166 creates a fluid damping structure 68 with a damping chamber 70 that may be described as self-pressurizing, and/or one configured to automatically correct circumferential pressure discrepancies that occur, with increasing whirl. By providing damping fluid at an elevated pressure into the supply plenum 160 (e.g., at a pressure greater than compartment/ambient pressure outside of the fluid damping structure 68), the fluid pressure within the damping chamber 70 will always remain above the compartment/ambient pressure, effectively preventing any air ingestion across the damping chamber seals and into the damping chamber 70.

The fluid damping structure 68 embodiment shown in FIGS. 12 and 12A does not require a check valve disposed in the damping fluid supply line. This embodiment can provide the functionality described above with or without a check valve in the supply line. A check valve can add additional cost and can be unreliable. Some embodiments of this fluid damping structure embodiment can also be implemented with a smaller axial dimension; e.g., only one supply plenum 160 is required, with fewer seals. The asymmetry of this fluid damping structure embodiment also improves the uniformity of the damping fluid flow pattern through the fluid damping structure 68 via leakage. The pressure coordination between the supply plenum 160 and the damping chamber 70 helps to avoid any fluid flow anomaly regions; e.g., regions with zero fluid flow. Some prior art squeeze film dampers are fed damping fluid directly from a supply source and are consequently susceptible to supply pressure variations. In contrast, the present disclosure supplies damping fluid to the damping chamber 70 through a supply plenum 160 or lateral chamber. As a result, the present disclosure effectively decouples pressure oscillations that may occur within the damping chamber 70 from the damping fluid supply line, thereby reducing the potential and/or severity of coupled supply flow line/squeeze film damper dynamic oscillations.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents. In addition, and as stated above, embodiments of the present disclosure are described in terms of a gas turbine engine application but are not limited to such application. Still further, the examples provided above describe that the damping fluid is provided from a lubrication system and returned via a scavenging system. The present disclosure is not limited to this type of damping fluid source and return.

Figure 13A:
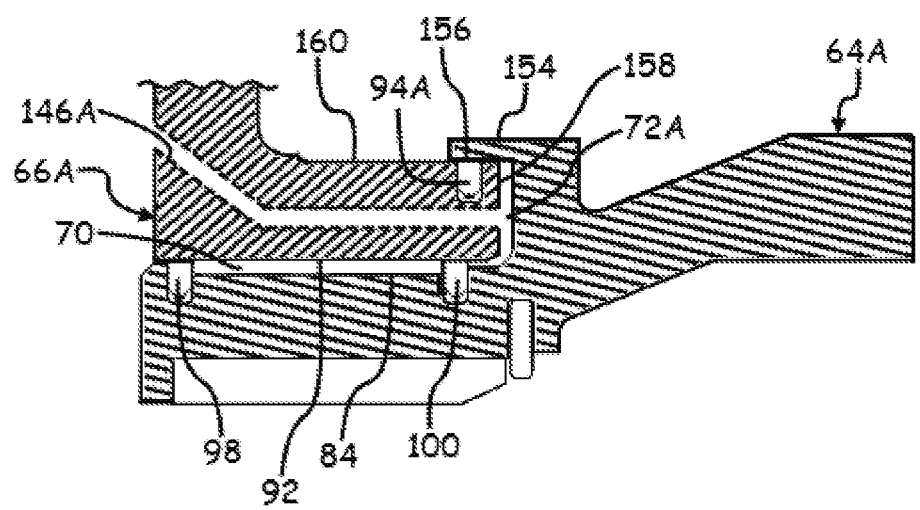
FIG. 13A is a simplified cross-sectional view of a portion of a gas turbine engine according to a first alternate embodiment showing a secondary seal in a first position.

FIG. 13A is a simplified cross-sectional view of a portion of gas turbine engine 20 according to a first alternate embodiment, and shows bearing housing 64A (with outer radial surface 84 and lip 154 including inner radial surface 156), stator structure 66A (with inner radial surface 92 and first lateral chamber port 146A), damping chamber 70, first lateral chamber 72A, first outer seal 94A, first inner seal 98, and second inner seal 100.

In this example, first outer seal 94A, first inner seal 98, and/or second inner seal 100 can include non-directional damper seals such as an elastomeric seal, a bellow seal, or a lip seal. Lip 154 is an annular extension of bearing housing 64A. In other examples, first outer seal 94A, first inner seal 98, and/or second inner seal 100 can include a non-contact seal such as a labyrinth seal. Inner radial surface 156 is an annular surface extending along a radially inward side of lip 154.

First lateral chamber 72A is formed by the sealing interfaces of second inner seal and first outer seal 94A. For example, first lateral chamber 72A is defined at least in part by outer radial surface 84 of bearing housing 64A, inner radial surface 92 of the stator structure 66A, first outer seal 94A, and second inner seal 100. First lateral chamber 72A extends in an axial direction from second inner seal 100 and in a radially outward direction along annular end-face 158 of stator structure 66A. As compared to previous embodiments discussed herein, first outer seal 94A is disposed at a different radial location than first inner seal 98 and second inner seal 100. First outer seal 94A is disposed radially outward from both of first inner seal 98 and second inner seal 100. With first outer seal 94A being positioned radially outward from second inner seal 100, first lateral chamber 72A extends partially in a radially outward direction so as to extend to first outer seal 94A. For example, first lateral chamber 72A is not only contained radially within outer radial surface 84 of bearing housing 64 and inner radial surface 92 of stator structure 66A.

In one example, first lateral chamber 72A can be connected to a fluid source (e.g., damping fluid source 76) via first lateral chamber port 146. First outer seal 94A is disposed along radially outward surface 160 of stator structure 66A and forms a sealing interface between stator structure 66A and inner radial surface 156 of lip 154. First outer seal 94A is set into and extends radially outward from a portion of stator structure 66A that is radially aligned with lip 154.

A drawback with existing self-pressurizing dampers can be that the axial length of the additional secondary seals and grooves can reduce the potential damping effect the seal configuration can achieve within a given axial length. The present disclosure with first outer seal 94A being disposed radially outward from both of first inner seal 98 and second inner seal 100 aims to address such shortcoming by locating first lateral chamber 72A away from and outside of damping chamber 70 to provide an air-free supply of oil to damping chamber 70.

Figure 13B:
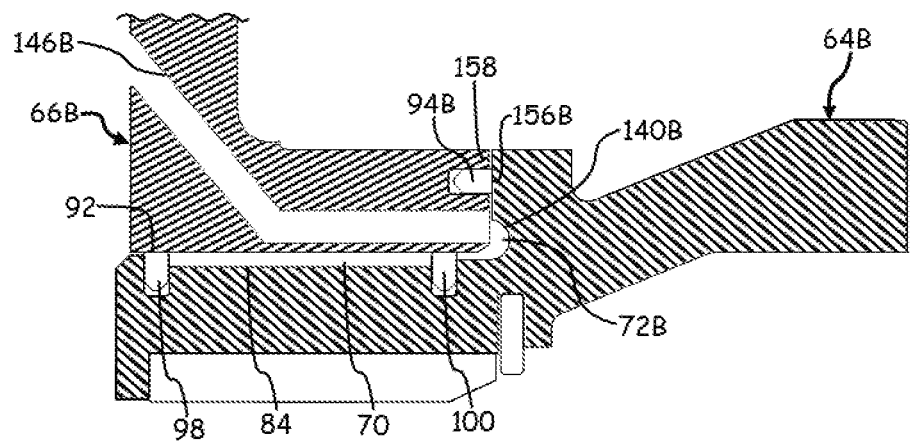
FIG. 13B is a simplified cross-sectional view of a portion of a gas turbine engine according to a second alternate embodiment showing the secondary seal in a second position.

FIG. 13B is a simplified cross-sectional view of a portion of gas turbine engine 20 according to a second alternate embodiment showing first outer seal 94B in different sealing position than first outer seal 94A of FIG. 13A. FIG. 13B shows bearing housing 64B (with outer radial surface 84 and passage 140B), stator structure 66B (with inner radial surface 92, first lateral chamber port 146B, and axial end-face 158B), damping chamber 70, first lateral chamber 72B, first outer seal 94B, first inner seal 98, and second inner seal 100.

Here, first outer seal 94B is disposed in and extends axially from a portion of axial end-face 158B of stator structure 66B. First outer seal 94B is in contact with axial face 156B of bearing housing 64B thereby forming a sealing interface between stator structure 66B and bearing housing 64B. As shown in FIG. 13B, a first portion of first lateral chamber 72B extends between outer radial surface 84 of bearing housing 64B and inner radial surface 92 of stator structure 66B. A second portion of first lateral chamber 72B extends across passage 140B between bearing housing 64B and stator structure 66B. A third portion of first lateral chamber 72B extends between As with the alternate positioning of first outer seal 94A in FIG. 13A, the positioning of first seal 94B enables an increased damping effect the seal configuration can achieve as compared to configurations with the secondary seal or seals disposed axially in-line with the inner seals (e.g., first inner seal 98 and second inner seal 100).

Figure 13C:
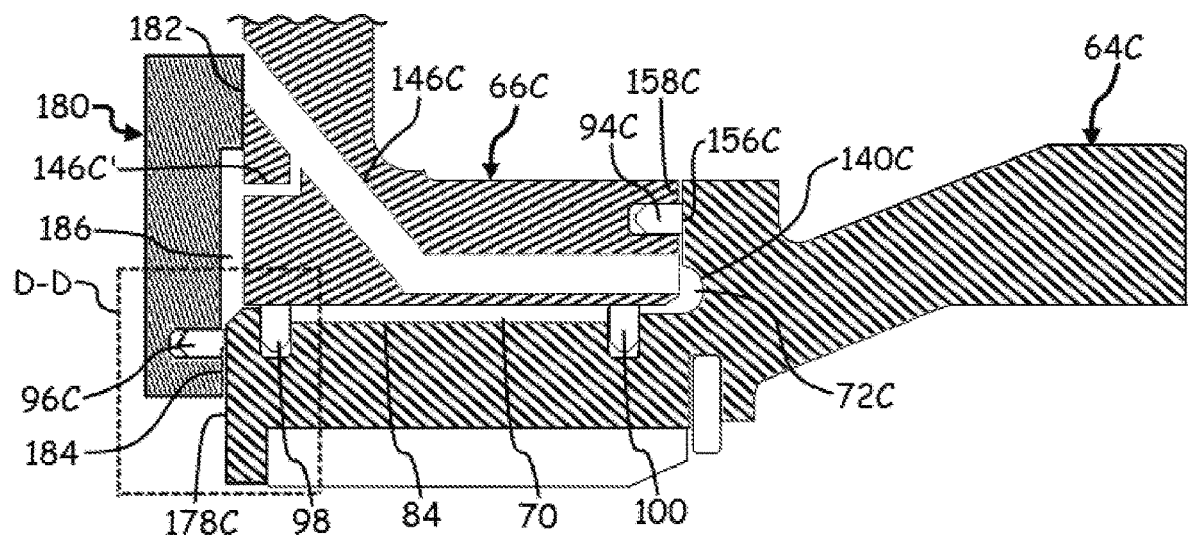
FIG. 13C is a simplified cross-sectional view of a portion of a gas turbine engine according to a third alternate embodiment showing two secondary seals.
Figure 13D:
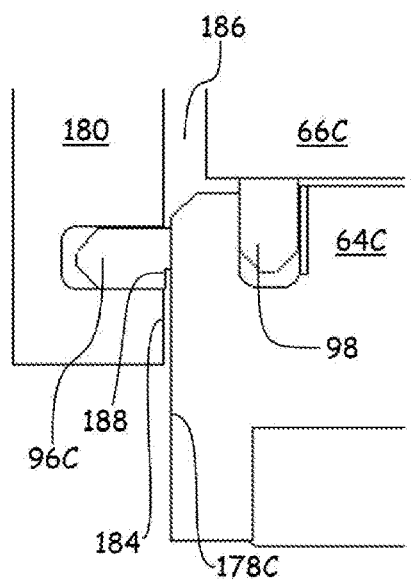
FIG. 13D is an enlarged view of the gas turbine engine identified by D-D shown in FIG. 13C.

FIG. 13C is a simplified cross-sectional view of a portion of a gas turbine engine according to a third embodiment with first outer seal 94C and second outer seal 96C. FIG. 13C shows bearing housing 64C (with outer radial surface 84, passage 140C, and axial end face 178C), stator structure 66C (with inner radial surface 92, first lateral chamber port 146C, second lateral chamber port 146C', and axial end-face 158C), damping chamber 70, first lateral chamber 72C, first outer seal 94C, second outer seal 96C, first inner seal 98, second inner seal 100, ring 180 (with first axial side-face 182 and second axial side-face 184), and plenum 186. FIG. 13D is an enlarged view of bearing housing 64C and stator structure 66C identified by D-D shown in FIG. 13C. FIGS. 13C and 13D are discussed in unison.

Second lateral chamber port 146C' is a channel or passage extending through a portion of stator structure 66C. In other example, stator structure can also not include second lateral chamber port 146C'. Axial end-face 178C is an axially facing wall of bearing housing 64C. Ring 180 is an annular piece of solid material. First axial side-face 182 and second axial side-face 184 are axial side-faces or end-wall portions of ring 180. Plenum 186 is an annular cavity or gap extending between ring 180 and portions of both bearing housing 64C and stator structure 66C. In this example, plenum 186 cuts axially into a portion on ring 180. Step 188 is a notch or step extending into or out of second outer seal 96C.

Second lateral chamber port 146C' fluidly connects first lateral chamber port 146C with plenum 186. Axial end-face 178C is disposed on a radial end of bearing housing 64C. Axial end-face is in contact with second outer seal 96C. First axial side-face 182 of ring 180 is disposed axially adjacent to and in contact with stator structure 66C. Second axial side-face 184 of ring 180 is disposed axially adjacent to axial end-face 178C of bearing housing 64C. Plenum 186 is fluidly connected to second outer seal 96C and to first inner seal 98. In this example, plenum 186 can be filled with a fluid with a corresponding supply pressure.

In this example, second outer seal 96C forms a sealing interface between second axial side-face of ring 180 and axial end-face 178C of bearing housing 64C. In some examples, a spring (e.g., wave spring) can be placed between ring 180 and second outer seal 96C to bias or axially load second outer seal 96C in an axial direction (e.g., left to right as shown in FIGS. 13C and 13D) against axial end-face 178C of bearing housing 64C. In this example, step 188

In this example, by putting step 188 on the sealing face of second outer seal 96C it an adequate pressure balance is maintained to provide sealing between ring and the sealing face since a side of second outer seal 96C that is exposed to plenum 186 (e.g., an upper side of second outer seal 96C as shown in FIG. 13D) is fully exposed to a supply pressure of plenum 186 while step 188 of second outer seal 96C has a significant area (e.g., a bottom side of second outside seal 96C as shown in FIG. 13D) that is exposed to an ambient pressure.

Figure 13E:
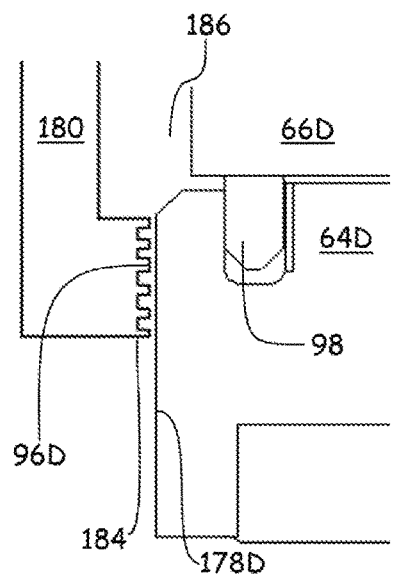
FIG. 13E is an alternate embodiment of the portion of the gas turbine engine identified by D-D shown in FIG. 13C.

FIG. 13E is an alternate embodiment D-D shown in FIG. 13C and shows bearing housing 64D (with axial end-face 178D), stator structure 66D, second outer seal 96D, first inner seal 98, and plenum 186.

In this example and as compared to the configuration shown in FIG. 13C, second seal 96D is shown as a non-contact seal. In particular, second outer seal 96D is shown as a labyrinth seal. The axial location of second outer seal 96D is well defined thereby enabling axial gaps between second outer seal 96D and axial end-face 178D of bearing housing 64D on the order of a thousandth of an inch. In this example, second outer seal 96D can also be a self-pressurizing seal. Such a self-pressurizing functionality would allow second outer seal 96D to operate at a relatively low pressure as compared to existing seal assemblies.

DISCUSSION OF POSSIBLE EMBODIMENTS

A fluid damping structure includes first and second annular elements, first and second inner seals, a first outer seal, a damping chamber, a supply plenum, a fill port, and a plurality of fluid passages. The first annular element with an outer radial surface and the second annular element having an inner radial surface. The first inner seal is disposed radially between and is engaged with both the first annular element and the second annular element. The second inner seal is disposed radially between and is engaged with both the first annular element and the second annular element. The first outer seal forms a sealing interface between the first annular element and the second annular element. The first outer seal is disposed radially outward from at least one of the first and second inner seals. The damping chamber is defined by the first annular element, the second annular element, the first inner seal, and the second inner seal. The supply plenum is disposed contiguous with an axial side of the damping chamber and extends from the second inner seal to the first outer seal. The fill port is in fluid communication with the supply plenum and a source of damping fluid. The plurality of fluid passages is disposed in the first annular element. The fluid damping structure is configured such that one or more of the fluid passages is disposed in an open configuration when a local damping fluid pressure within the damping chamber is less than a local damping fluid pressure in an adjacent region of the supply plenum, and the one or more of the fluid passages is disposed in a closed configuration when the local damping fluid pressure within the damping chamber is greater than the local damping fluid pressure in the adjacent region of the supply plenum.

The fluid damping structure of the preceding paragraph can optionally include, additionally and/or alternatively, any one or more of the following features, configurations, and/or additional components.

A ring disposed axially adjacent to the first and second annular elements, a second outer seal, wherein the second outer seal forms a sealing interface between the ring and the second annular element, and/or a plenum formed between the ring and the first annular element, wherein the plenum can be partially enclosed by the second outer seal, and wherein the plenum can be in fluid communication with the first inner seal.

The second seal can comprise a non-contact seal.

The second seal can be disposed radially inward from at least one of the first and second inner seals.

The first outer seal can form a sealing interface between an axial end-face of the first annular element and an axial face of the second annular element.

The first annular element can include an axially extending lip with a radially inner surface, the second annular element can include a radially outer surface, the first outer seal can be disposed between the radially inner surface of the axially extending lip and the radially outer surface of the second annular element, and/or the sealing interface formed by the first outer seal can be formed between the radially inner surface of the axially extending lip and the radially outer surface of the second annular element.

The first annular element can include an axial face, the second annular element can include an axial end-face, the first outer seal can be disposed between the axial face of the first annular element and the axial end-face of the second annular element, and/or the sealing interface formed by the first outer seal can be formed between the axial face of the first annular element and the axial end-face of the second annular element.

The damping chamber can comprise an annular void extending axially from the first inner seal to the second inner seal.

The first annular element can comprise a bearing housing of a gas turbine engine.

The second annular element can comprise a stator structure of a gas turbine engine.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment(s) disclosed, but that the disclosure will include all embodiments falling within the scope of the appended claims.

The invention claimed is:

1. A fluid damping structure comprising:
a first annular element having an outer radial surface;
a second annular element having an inner radial surface;
a first inner seal disposed radially between and engaged with both the first annular element and the second annular element;
a second inner seal disposed radially between and engaged with both the first annular element and the second annular element;
a first outer seal forming a sealing interface between the first annular element and the second annular element, wherein the first outer seal is disposed radially outward from at least one of the first and second inner seals;
a damping chamber defined by the first annular element, the second annular element, the first inner seal, and the second inner seal;
a supply plenum disposed contiguous with an axial side of the damping chamber, wherein the supply plenum extends from the second inner seal to the first outer seal;
a fill port in fluid communication with the supply plenum and a source configured to supply a damping fluid;
a plurality of fluid passages disposed in the first annular element; and
wherein the fluid damping structure is configured such that one or more of the fluid passages is disposed in an open configuration when a local damping fluid pressure within the damping chamber is less than a local damping fluid pressure in an adjacent region of the supply plenum, and the one or more of the fluid passages is disposed in a closed configuration when the local damping fluid pressure within the damping chamber is greater than the local damping fluid pressure in the adjacent region of the supply plenum.

2. The fluid damping structure of claim 1, and further comprising:
a ring disposed axially adjacent to the first and second annular elements;
a second outer seal, wherein the second outer seal forms a sealing interface between the ring and the second annular element; and
a plenum formed between the ring and the first annular element, wherein the plenum is partially enclosed by the second outer seal, and wherein the plenum is in fluid communication with the first inner seal.

3. The fluid damping structure of claim 2, wherein the second outer seal comprises a non-contact seal.

4. The fluid damping structure of claim 2, wherein the second outer seal is disposed radially inward from at least one of the first and second inner seals.

5. The fluid damping structure of claim 1, wherein the first outer seal forms a sealing interface between an axial end-face of the first annular element and an axial face of the second annular element.

6. The fluid damping structure of claim 1, further comprising:
wherein the first annular element includes an axially extending lip with a radially inner surface;
wherein the second annular element includes a radially outer surface;
wherein the first outer seal is disposed between the radially inner surface of the axially extending lip and the radially outer surface of the second annular element; and
wherein the sealing interface formed by the first outer seal is formed between the radially inner surface of the axially extending lip and the radially outer surface of the second annular element.

7. The fluid damping structure of claim 1, wherein:
the first annular element includes an axial face;
the second annular element includes an axial end-face;
the first outer seal is disposed between the axial face of the first annular element and the axial end-face of the second annular element; and
the sealing interface formed by the first outer seal is formed between the axial face of the first annular element and the axial end-face of the second annular element.

8. The fluid damping structure of claim 1, wherein the damping chamber comprises an annular void extending axially from the first inner seal to the second inner seal.

9. The fluid damping structure of claim 1, wherein the first annular element comprises a bearing housing of a gas turbine engine.

10. The fluid damping structure of claim 1, wherein the second annular element comprises a stator structure of a gas turbine engine.

* * * * *